(12) United States Patent
Appalaraju et al.

(10) Patent No.: US 10,467,526 B1
(45) Date of Patent: Nov. 5, 2019

(54) ARTIFICIAL INTELLIGENCE SYSTEM FOR IMAGE SIMILARITY ANALYSIS USING OPTIMIZED IMAGE PAIR SELECTION AND MULTI-SCALE CONVOLUTIONAL NEURAL NETWORKS

(71) Applicant: Amazon Technologies, Inc., Seattle, WA (US)

(72) Inventors: Srikar Appalaraju, Seattle, WA (US); Vineet Shashikant Chaoji, Bangalore (IN)

(73) Assignee: Amaon Technologies, Inc., Seattle, WA (US)

( * ) Notice: Subject to any disclaimer, the term of this patent is extended or adjusted under 35 U.S.C. 154(b) by 106 days.

(21) Appl. No.: 15/873,725

(22) Filed: Jan. 17, 2018

(51) Int. Cl.
 *G06N 3/08* (2006.01)
 *G06K 9/46* (2006.01)
 *G06K 9/62* (2006.01)

(52) U.S. Cl.
 CPC ............ *G06N 3/08* (2013.01); *G06K 9/4619* (2013.01); *G06K 9/6215* (2013.01); *G06K 9/6256* (2013.01)

(58) Field of Classification Search
 None
 See application file for complete search history.

(56) References Cited

U.S. PATENT DOCUMENTS 10,210,627 B1* 2/2019 Vitsnudel .................. G06T 7/60
2017/0294010 A1* 10/2017 Shen ...................... G06T 7/0002

OTHER PUBLICATIONS

Martin, K., Wiratunga, N., Massie, S., & Clos, J. (Dec. 2018). Informed Pair Selection for Self-paced Metric Learning in Siamese Neural Networks. In International Conference on Innovative Techniques and Applications of Artificial Intelligence (pp. 34-49). Springer, Cham. (Year: 2018).*
U.S. Appl. No. 14/731,138, filed Jun. 5, 2015, Srikar Appalaraju.
Vijay Chandrasekhar, et al, "A practical guide to CNNs and Fisher Vectors for image instance retrieval", arX1V:1508.02496v3, Aug. 25, 2015, pp. 1-30.
Sebastian Ruder, "An overview of gradient descent optimization algorithms", arXiv:1609.047472v2, Jun. 15, 2017, pp. 1-14.
Pulkit Agrawal, et al., "Analyzing the Performance of Multilayer Neural Networks for Object Recognition", arXiv:1407.1610v2, Sep. 22, 2014, pp. 1-21.

(Continued)

*Primary Examiner* — David Perlman
(74) *Attorney, Agent, or Firm* — Robert C. Kowert; Meyertons, Hood, Kivlin, Kowert & Goetzel, P.C.

(57) ABSTRACT

At an artificial intelligence system, a neural network model is trained iteratively to generate similarity scores for image pairs. The model includes a first subnetwork with a first number of convolution layers, and a second subnetwork with a different number of convolution layers. A given training iteration includes determining, using a version of the model generated in an earlier iteration, similarity scores for a set of image pairs, and then selecting a subset of the pairs based on the similarity scores. The selected subset is used to train a subsequent version of the model. After the model is trained, it may be used to generate similarity scores for other image pairs, and responsive operations may be initiated if the scores meet a criterion.

20 Claims, 11 Drawing Sheets

(56) References Cited

OTHER PUBLICATIONS

Timo Ahonen, et al., "Face Description with Local Binary Patterns: Application to Face Recognition", Draft, Jun. 5, 2006, pp. 1-6.
S. Avila, et al., "Pooling in image representation: The visual codeword point of view", Elsevier Computer Vision and Image Understanding, 2012, pp. 1-13.
Artem Babenko, et al., "Neural Codes for Image Retrieval", arXiv:1404.1777v2, Jul. 7, 2014, pp. 1-16.
Yoshua Bengio, et al., "Curriculum Learning", Proceedings of the 26th International Conference on Machine Learning, 2009, pp. 1-9.
Clement Farabet, et al., "Learning Hierarchical Features for Scene Labeling", IEEE Transactions on Pattern Analysis and Machine Intelligence, 2013, pp. 1915-1929.
Andreas Geiger, et al., "Visions meets Robotics: The KITTI Dataset", International Journal of Robotics Research (IJRR), 2013, pp. 1229-1235.
Ian J. Goodfellow, et al., "Generative Adversarial Nets", Advances in neural information processing systems, 204, pp. 1-9.
Xufeng Han, et al., "MatchNet: Unifying Feature and Metric Learning for Patch-Based Matching", Computer Vision Foundation, IEEE Xplore, 2015, pp. 3279-3286.
P. Viola, et al., "Rapid Object Detection Using a Boosted Cascade of Simple Features", Mitsubishi Electric Research Laboratories, May 2004, pp. 1-5.
Kaiming He, et al., "Deep Residual Learning for Image Recognition", Computer Vision Foundation, IEEE Xplore, 2015, pp. 770-778.
Diederik P. Kingma, et al., "Auto-Encoding Variational Bayes", arXiv:1312.6114v10, May 1, 2014, pp. 1-14.
Alex Krizhevsky, et al., "ImageNet Classification with Deep Convolutional Neural Networks", Advances in neural Information processing systems, 2012, pp. 1-9.
Alex Krizhevsky, et al., "Learning Mutliple Layers of Features from Tiny Images", Technical report, University of Toronto; Apr. 8, 2009, pp. 1-60.
Kai A. Krueger, et al., "Flexible shaping: How learning in small steps helps", Elsevier Cognition 110, 2009, pp. 380-394.
Yann LeCun, et al., "Efficient BackProp", In Neural networks: Tricks of the trade, Springer, Berlin, Heidelberg, pp. 1-44.
Tsung-Yi Lin, et al., "Learning Deep Representation for Ground-to-Aerial Geolocalization", Computer Vision Foundation, 2015, pp. 5007-5015.
David G. Lowe, "Distinctive Image Features from Scale-Invariant Keypoints", International Journal of Computer Vision, 2004, pp. 1-5.
Laurens van der Maaten, et al., "Visualizing Data using t-SNE", Journal of Machine Learning Research 9, 2005, pp. 2579-2605.
Vinod Nair, et al., "Rectified Linear Units Improve Restricted Boltzmann Machines", Proceedings of the 27th International Conference on Machine Learning, 2010, pp. 1-3.
Matthew Brown, et al., "Discriminative Learning of Local image Descriptors", IEEE Transactions on Pattern Analysis and Machine Intelligence, 2011, pp. 43-57.
Qi Qian, et al., "Distance Metric Learning Using Dropout: A Structured Regularization Approach", ACM, KDD'14, Aug. 24-27, 2014, pp. 1-10.
Florian Schroff, et al., "FaceNet: A Unified Embedding for Face Recognition and Clustering", Computer Vision Foundation, 2015, pp. 815-823.
Karen Simonyan, et al., "Very Deep Convolutional Networks for Large-Scale Image Recognition", arXiv:1409.1556vs, Apr. 15, 2015. pp. 1-14.
Edgar Simo-Serra, et al., "Discriminative Learning of Deep Convolutional Feature Point Descriptors" Proceedings of the IEEE International Conference on Computer Vision. 2015, pp. 118-126.
Nitish Srivastava, et al., "Dropout: A Simple Way to Prevent Neural Networks from Overfitting", Journal of Machine Learning Research 15, 2014, pp. 1929-1958.
Ilya Sutskever, et al., "On the importance of initialization and momentum in deep learning", Proceedings of the 30th International Conference on Machine Learning, 2013, pp. 1-14.
Christian Szegedy, et al., "GoogleNet: Going Deeper with Convolutions", p. 1.
Jason Yosinski, et al, "How transferable are features in deep neural networks?", Advances in neural information processing systems. 2014, pp. 1-9.
Sergey Zagoruyko, et al., "Learning to Compare Image Patches via Convolutional Neural Networks", Proceedings of the IEEE Conference on Computer Vision and Pattern Recognition. 2015, pp. 4353-4361.
Jure Zbontar, et al., "Stereo Matching by Training a Convolutional Neural Network to Compare Image Patches", Journal of Machine Learning Research 17, 2016, pp. 1-32.

* cited by examiner

Across epochs, use epoch-count depended parameter to downsample image pairs based on increasing degree of image pair discrimination difficulty 610

Inter-epoch curriculum learning methodology 602

Within each training epoch/iteration, sort and prune training example image pairs of each training batch or mini-batch based on increasing degree of image pair discrimination difficulty 610

Intra-epoch curriculum learning methodology 601

FIG. 6

ARTIFICIAL INTELLIGENCE SYSTEM FOR IMAGE SIMILARITY ANALYSIS USING OPTIMIZED IMAGE PAIR SELECTION AND MULTI-SCALE CONVOLUTIONAL NEURAL NETWORKS

BACKGROUND

As the costs of data storage have declined over the years, and as the ability to interconnect various elements of the computing infrastructure has improved, more and more data pertaining to a wide variety of applications can potentially be collected and analyzed using increasingly sophisticated machine learning algorithms. The analysis of data collected from sensors embedded within airplane engines, automobiles, health monitoring devices or complex machinery may be used for various purposes such as preventive maintenance, proactive health-related alerts, improving efficiency and lowering costs. Streaming data collected from an online retailer's websites can be used to make more intelligent decisions regarding the quantities of different products which should be stored at different warehouse locations, and so on. Data collected about machine servers may be analyzed to prevent server failures. Photographs and videos may be analyzed, for example, to detect anomalies which may represent potential security breaches, or to establish links with other photographs or videos with a common subject matter.

Some machine learning algorithms, including for example various types of neural network models used for "deep learning" applications include image analysis applications, may typically require long training times due to the need for a large number of training examples. Often, the number of parameters whose values are to be learned in such models may be quite large—e.g., the model may comprise a number of internal layers, also referred to as "hidden" layers, each with their own sets of parameters, and the total number of parameters may be in the millions. As a result, training data sets with tens or hundreds of millions of examples may have to be found and labeled for some applications.

The problem of large training data sets may become even more burdensome when combinations of input records have to be constructed. For example, for some types of image similarity analysis algorithms, pairs of images may have to be analyzed together, and the total number of pairs which can be generated from even a moderately-sized collection of images may quickly become unmanageable. Of course, if the training data set selected for a model (e.g., using random sampling of the available examples) is too small, the quality of the model results may suffer. Even though the available processing power and storage space of computing systems used for model training has increased substantially over time, training high-quality models for which extremely large training data sets may be generated remains a challenging technical problem.

BRIEF DESCRIPTION OF DRAWINGS

FIG. 6 illustrates an overview of the use of curriculum training methodologies during image similarity model training at two levels: an intra-iteration level, and an inter-iteration level, according to at least some embodiments.

Figure 1:
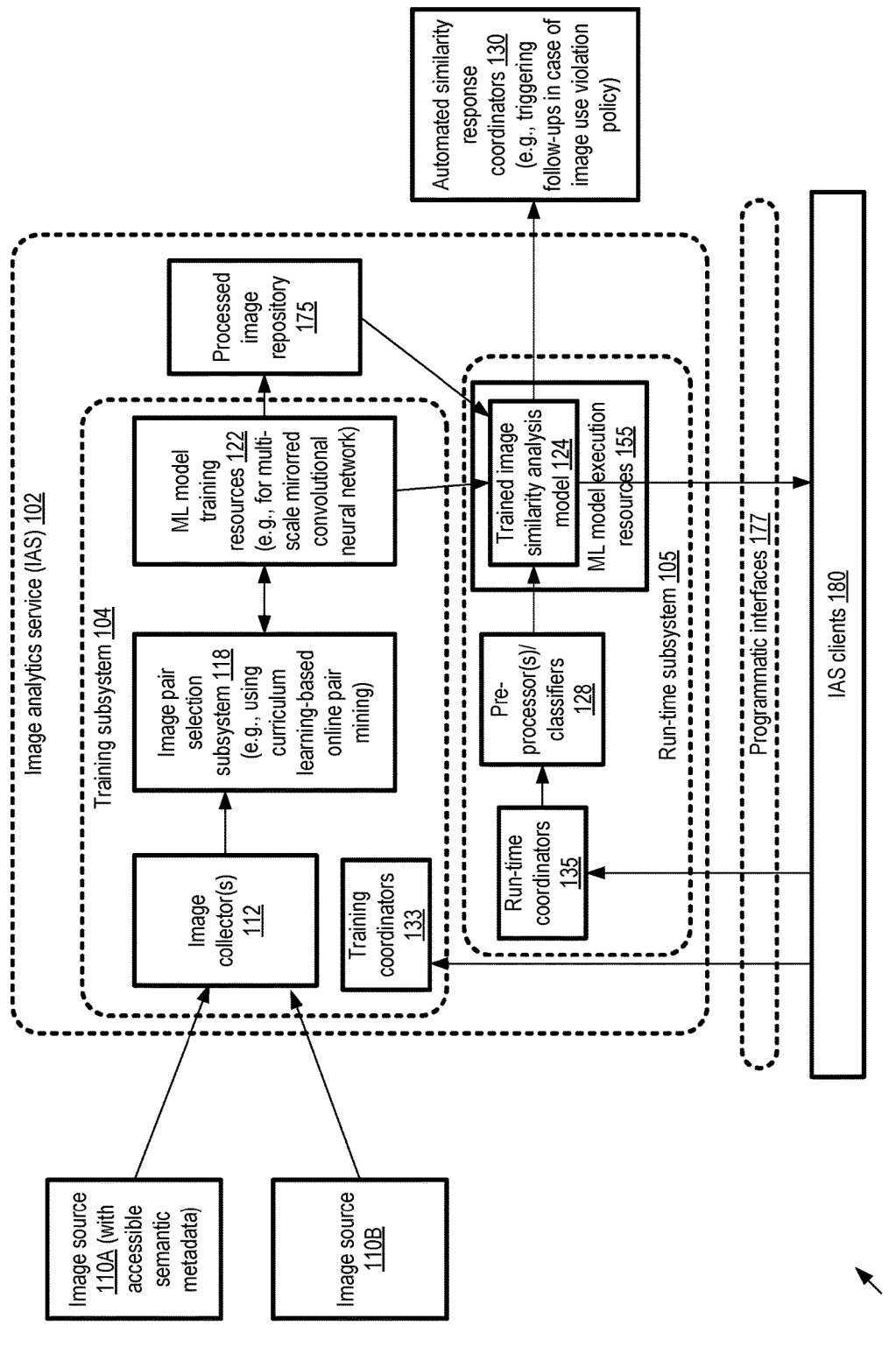
FIG. 1 illustrates an example system environment in which a combination of curriculum learning based-training data set selection and a multi-scale convolutional neural network model may be employed for image similarity analysis, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for image similarity analysis using a combination of machine learning techniques, including optimized selection of training image pairs and the use of a multi-scale mirrored neural network in which respective subnetworks analyze images at different scales using respective counts of convolution layers are described. Image similarity scores generated using such a model, which indicate how similar a given image is to various other images of interest, may be used for a variety of applications in different embodiments, including for example image usage policy enforcement applications (such as applications which attempt to identify the unauthorized use of corporate logos and the like), security related applications (where the similarity or differences between evidence artifacts may have to be determined), searches for other images similar to an input image or input concept, and so on. Given the very large number of images that are being generated, stored and distributed every day (e.g., as individuals use their smart-phone cameras), training and executing image similarity score generating machine learning models efficiently may be a high priority for numerous organizations which deploy or utilize such applications.

According to various embodiments, at a high level the model training methodology used for a neural network model designed to generate image similarity scores for various pairs of images may be summarized as follows. The neural network model may be trained iteratively, with the overall training process comprising a plurality of epochs (passes over the training data selected), and each epoch in turn involving learning from some number of mini-batches of training examples. Individual ones of the training examples may comprise a pair of images $I_1$ and $I_2$ and a similarity-based label (e.g., the logical equivalent of a 0/1 indicating similarity/dissimilarity respectively) corresponding to the pair. A given pair of images ($I_1$, $I_2$) may be labeled either as a positive pair or a negative pair in some embodiments, with the two images of a positive pair being designated as similar to one another based on one or more criteria, and the two images of a negative pair being designated as dissimilar to one another. A particular image with respect to which similarity of other images is to be analyzed may be designated as a "source" image Is (or a "query" image) in some embodiments. A positive image pair comprising Is as one of the images may be referred to using the notation ($I_s$, $I_p$) in such embodiments, where the subscript "p" stands for positive; similarly, a negative image pair may be referred to using the notation ($I_s$, $I_n$), where the subscript "n" stands for negative.

In at least some embodiments, the available set of positive and negative image pairs for a given application involving image similarity analysis (such as an application involving detecting and responding to violations of image usage policies, as discussed below in further detail) may potentially be quite large. Labeling all the potentially available pairs and training the model using all the available pairs may be quite expensive in terms of time and resources. Intuitively, at least in some cases, a subset of the image pairs may be more helpful with regard to the learning achieved by the model, while other image pairs may be less helpful, especially as the model training progresses and the model has already learned more about image similarity in previous epochs. Accordingly, in various embodiments, a number of techniques may be used to optimize the selection and ordering of training input examples to be provided to the model. Such techniques may be based at least in part on the concept of curriculum learning, according to which (at a high level) the degree of difficulty with respect to the prediction or result being generated for a given training example is gradually increased during the course of training. As discussed below in further detail, curriculum learning-inspired techniques may be implemented at several different levels of granularity in some embodiments—e.g., at both intra-epoch granularity (when selecting and ordering training examples of a mini-batch) as well as inter-epoch granularity (using parameters which depend on the number of epochs that have been completed to perform weighted sampling of image pairs). As a result of using the curriculum learning-based optimizations, a number of technical advantages may be obtained in various embodiments. For example, the neural network model may learn quicker and therefore converge faster, using fewer computing, storage and/or network resources overall in some embodiments. Furthermore, the quality of the model's output (e.g., the scores indicative of image similarity) may at least in some cases be higher than may have been achieved without using curriculum learning-based optimizations, leading to better overall performance of the applications which rely on image similarity-based decisions.

In addition to the intelligent selection and sequencing of input training examples, the architecture of the neural network model itself may be optimized for various types of image similarity-based applications in various embodiments. For example, respective subnetworks which comprise different numbers of convolution layers may be included within the overall model in some embodiments—e.g., one subnetwork may include 16 convolution layers, another may use 8 convolution layers, a third may use 4 convolution layers, and so on. The non-uniform convolution layer subnetworks may be helpful because, when determining similarities between images, the complexity or sophistication of the features detected in a convolutional subnetwork may vary with the number of convolution layers, and the level of feature sophistication that works best for analyzing/comparing a given image pair may depend on the complexity of the figures being analyzed. Thus, for example, when determining whether a relatively simple logo image is similar to another image, relatively few convolution layers may work best; while when determining whether an image of a human face or a complex street scene is similar to another, a network with more convolution layers may provide a better result. In various embodiments, the output from the different subnetworks may comprise respective vectors of different lengths (indicative for example of the sophistication of the features detected in the images)—e.g., a subnetwork with N convolution layers may generate an output vector of length M, a subnetwork with 3N convolution layers may generate an output vector of length 2M, and so on. In at least some embodiments, these subnetwork outputs comprising vectors of different lengths may be normalized and/or aggregated at one or more layers or stages of the overall network—e.g., an L2 normalization layer and/or a linear embedding layer may be employed in some implementations as discussed below. A model comprising a combination of the different subnetworks with different counts of convolutional subnetworks may be termed a multi-scale convolutional neural network in at least some embodiments, as the scale or granularity at which a given image is processed may differ from one subnetwork to another. For example, in one embodiment, respective sub-samples of a source image, with different sampling ratios, may be consumed as input by the respective convolutional subnetworks.

The overall neural network model may be arranged in a mirrored configuration in at least some embodiments, such that of the two images of a given pair of images provided as input to the model as a whole, one image is processed at one mirror, while the other image is processed at the second mirror. In various embodiments in which multi-scaling of the kind described above is implemented, a respective convolutional subnetwork with the same number of convolution layers may be include in each of the mirrors, with at least some of the parameters (e.g., weights, biases etc. of the artificial neurons) being shared among the mirrors. As such, during training, when a particular parameter such as a weight of one artificial neuron or link between neurons is updated, that update may be duplicated at each of the two mirrors. Such mirrored configurations may also be referred to as "Siamese" neural networks in some embodiments.

In at least some embodiments, a given pair of images may be labeled, for the purposes of model training, as a positive or similar pair based on a variety of criteria. Visual similarity, in which for example the shapes, colors, patterns and the like of the objects are taken into account, may be used to classify images as similar in various embodiments. In addition, for the purposes of some applications, it may be useful to classify images as similar based on semantic criteria instead of, or in addition to, classifying the images as similar based on visual criteria. For example, with respect to logos or symbols representing an organization, some symbols may be graphics-oriented while others may be more text-oriented. For the purposes of identifying images that may both represent a given organization, an image pair consisting of one graphical logo and one image of a company's name may be considered a positive image pair in some embodiments. In various embodiments, images to be used for training may be collected from a variety of image sources (such as web sites), at least some of which may also comprise semantic metadata associated with the images (such as an indication of the name of the organization which owns a web site). In at least some embodiments, such semantic metadata may be analyzed to determine whether two images are to be designated as similar, even if they may not look alike from a purely visual perspective.

According to one embodiment, different sets of resources may be employed for the selection and sequencing of training image pairs than are employed for the actual training of the neural network based machine learning model. For example, a set of multithreaded (or single-threaded) CPUs may be employed for selecting and ordering the training image pairs, while a set of graphical processing units or GPUs may be used to train the model (or, more generally, different combinations of CPUs and/or GPUs may be used for the two types of tasks). In this approach, which may be referred to as "online image pair mining", a version of the model that was trained in an earlier iteration and check-pointed or saved may be executed at the pair selection resources, obtaining respective similarity scores or intra-pair distance metrics from the partially trained model for some set of positive and negative pairs. Then, in some embodiments, those scores or intra-pair distance metrics may be used, in combination with one or more image pair discrimination difficulty criteria, to produce a sorted list of training image pairs (e.g., in increasing order of discrimination difficulty). As implied by the term discrimination difficulty criteria, the pairs of images may in effect be arranged in such a way that the first few pairs may be more different from each other, and therefore easier to distinguish by the model, than the last few pairs. That list may be further processed or shortened in various embodiments, e.g., using a margin constraint rule based on a hyperparameter value, and/or based on class imbalance criteria. The margin constraint may be considered another type of image difficulty criterion in some embodiments. Additional details regarding the margin constraint rules and class imbalance criteria that may be employed in different embodiments are provided below.

Considerable effort may potentially be required to identify similar or positive pairs of images for a given application. In some embodiments, new images may be synthesized or created (e.g., using additional machine learning models) to help obtain a sufficient number of positive image pairs to train the model. For example, a given source image may be obtained from a web site or other image repository, and then slightly modified (e.g., by changing or rearranging a few pixels) to generate a second image which can be included with the source image in a positive image pair. A much larger universe of dissimilar images may typically be available; in some embodiments, to identify an image to be included in a negative pair with a given source image, a random selection algorithm may be used.

Example System Environment

FIG. 1 illustrates an example system environment in which a combination of curriculum learning based-training data set selection and a multi-scale convolutional neural network model may be employed for image similarity analysis, according to at least some embodiments. As shown, system 100 includes various components and artifacts of an image analytics service (IAS) 102, which may be logically subdivided into a training subsystem 104 (at which machine learning models for image processing may be trained) and a run-time subsystem 105 (at which the trained models may be executed for various input images received at the image analytics service). In the depicted embodiment, the training subsystem 104 may comprise one or more training coordinators 133, image collectors 112, an image pair selection subsystem 118 and machine learning (ML) model training resources 122, each of which may be implemented using one or more computing devices.

Training coordinators 133 may, for example, receive model training requests from image analytics service clients 180 via one or more programmatic interfaces 177 (such as web-based consoles, application programming interfaces, command-line tools, and/or graphical user interfaces) in the depicted embodiment. The training coordinators 133 may orchestrate the tasks involved in training various types of machine learning models for image analysis-based applications, including the gathering of images and metadata to be used for training, the intelligent selection and ordering of image pairs for inclusion in training data sets for the models, the training iterations of the models using resources 122, and the like. After a model, such as a mirrored multi-scale neural network based model designed to generate image similarity scores for input image pairs, has been trained, it may be deployed at the run-time subsystem 105 in various embodiments.

The run-time subsystem 105 may comprise, for example, one or more run-time coordinators 135, image pre-processors 128, as well as resources 155 that may be used to execute trained versions 124 of the models produced at the training subsystem 104 in the depicted embodiment. The run-time coordinators 135, image pre-processors 128, and the model execution resources 155 may also be implemented using one or more computing devices in various embodiments. In response to an image similarity determination request submitted by an IAS client 180, which may indicate a source image for which similar images are to be identified, a run-time coordinator 135 may pass the source image through one or more pre-processing steps 128 (e.g., in which a category to which the source image probably belongs may be identified) and execute the trained model 124. The trained model 124 may generate respective similarity scores between the source image indicated in the client's request, and some number of other images stored in the processed image repository 175 in the depicted embodiment. In some embodiments, intermediate results of analyzing various images using the models (during or after training) and/or image classifiers may be accumulated in the repository 175 over time—for example, a number of images may be classified, and the classes to which the images belong may be stored in the repository 175, or feature vectors generated for the images using the models may be stored in the repository 175. Class information stored regarding the previously-processed images may be used to select a subset of the images with which the similarity analysis for a given source image is to be performed at run-time in some embodiments. In at least one embodiment, a given run-time request submitted by a client may include two images for which a similarity score is to be generated using the trained model 124 (or n images, where n is greater than two, such that image similarity scores between different pair combinations of the n images are to be generated).

The results of the similarity analysis performed using the trained model 124 for various types of client requests may be provided to the clients 180 in various embodiments. In at least some embodiments, depending on the type of application for which image similarity scores are obtained, one or more automated operations may be performed based on the similarity scores. For example, consider a scenario in which an application is designed to identify cases of improper use of images or violations of image use policies (such as the unauthorized use of logos of an organization or business entity). If an apparent improper use of an image is identified, e.g., based on a similarity score generated by model 124 that exceeds some threshold, an automated similarity response coordinator 130 implemented at one or more computing devices may initiate a response action, such as a communication indicating the occurrence of the violation to the apparent policy violator. Other types of actions or operations may be performed in response to determining that a similarity score meets a threshold criterion—for example, if the model 124 is employed on behalf of an image search application, one or more images that are found to be similar to the source image may be indicated to a client 180.

Images that can be used to train the model(s) may be acquired from a variety of image sources 110 (e.g., 110A or 110B) by image collectors 112 in the depicted embodiment, e.g., via respective sets of programmatic interfaces. Such image source may include, for example, publicly accessible image databases, commercial image sources which require payment to access the images, publicly accessible web sites, data sets that are shared in the artificial intelligence/machine learning research community, and so on. In at least some cases (as in the case of image source 110A), the images may have associated semantic metadata which can also be accessed by the image collectors 112 programmatically. Such semantic information may be used to classify some pairs of images (such as images of company logos and company names) as similar based on the meaning or semantics associated with the images in some embodiments, even if the images of the pair do not necessarily look like one another. In various embodiments, the image collectors 112 may be responsible for labeling pairs of collected images as positive pairs (in which case the images of the pair are considered similar to one another) and negative pairs (in which case the images are considered dissimilar to one another). In at least one embodiment, a network-accessible service which can be used to hire individuals for various types of small or short-term tasks, such as classifying images as similar or dissimilar, may be employed to obtain a collection of positive or negative image pairs for use in the training subsystem 104. Some image sources may provide pre-labeled images from which positive and negative pairs can be generated, or even provide pairs of images that are already labeled as positive or negative pairs in one embodiment. In some embodiments, in order to generate a positive pair of images, a slight modification may be applied to the first image of a pair, and the modified or synthesized image may be used as the second image of the pair—that is, instead of using images that were generated by some external entity, a new similar image may be created at the image analytics service to obtain a positive image pair. Since, with respect to a given source image, the set of available dissimilar images may be quite large in various embodiment, random selection within a collection of images may sometimes be used to identify the second image of a negative pair.

In at least one embodiment, a neural network model for image similarity analysis may be trained iteratively, with the training examples to be used during various phases of the training being identified at the image pair selection subsystem. The model may, for example, comprise a plurality of subnetworks including a first subnetwork and a second subnetwork, as well as one or more subnetwork output aggregation stages. The number of convolution layers in the first subnetwork may differ from the number of convolution layers in the second subnetwork—e.g., the first subnetwork may include 16 convolution layers, each comprising some number of artificial neurons or nodes, while the second subnetwork may comprise just 8 such layers. The difference in the number of convolution layers may enable the different subnetworks to detect image features of respective levels of complexity—e.g., subnetworks with fewer convolution layers may be able to detect high-level features or shapes better, while subnetworks with more convolution layers may be able to detect more subtle aspects of images better. In some embodiments, a given image may be subsampled before being processed at one or more of the subnetworks—e.g., using a different sampling ratio for subnetworks with different numbers of convolution layers.

In various embodiments, the overall neural network model may comprise a pair of mirrors, each of which comprises a replica of the set of subnetworks—e.g., in the above example, each mirror may comprise a subnetwork with 16 convolution layers, and another subnetwork with 8 convolution layers. Of the two images of an input pair of images, one may be analyzed using the first mirror, and one may be analyzed using the second mirror. The outputs of the different subnetworks may comprise feature vectors or embeddings of different lengths in different embodiments—e.g., one subnetwork may produce an output vector of length 512, while another subnetwork may produce an output vector of length 1024. The output vectors of different lengths generated with respect to a given image may be combined and/or normalized using one or more subnetwork output aggregation stages (such as an L2 normalization layer and/or a linear embedding layer) in various embodiments. A contrastive loss function may be used for the overall neural network model in at least some embodiments, as discussed below in further detail.

The training of a neural network-based model of the kind discussed above may comprise a plurality of iterations or epochs in some embodiments. In a given training iteration, a plurality of candidate training image pairs may be initially be identified at the image pair selection subsystem, including for example one or more positive pairs and one or more negative pairs. A number of operations may be performed to optimize the selection of training image pairs from among the candidates in some embodiments, e.g., using the intuition that the model is likely to learn to identify similarities among the images of a pair more effectively if the pairs (a) meet some criteria regarding the extent of the differences among the images of the pairs and (b) are provided as input to the model in order of increasing discrimination difficulty. In one embodiment, in training iterations other than the very first iteration, respective similarity scores (such as Euclidean distances between feature vector representations of the images) for the candidate image pairs may be determined at the image pair selection subsystem, e.g., using a version of the model that was trained in a previous iteration. A sorted subset of the candidate training image pairs may be identified in some embodiments, based at least in part on the respective similarity scores and one or more image pair discrimination difficulty criteria (indicative of how difficult it is to distinguish or discriminate among the images of a given pair). The candidates may initially be sorted, for example, in order of decreasing intra-pair similarity, and some of the pairs that lie at either end of the sorted candidate list may be eliminated based on a similarity margin threshold requirement, as discussed below in further detail. In one embodiment, the sorted subset of candidate pairs may be further shortened based on class imbalance criteria—e.g., if the sorted subset comprises X % positive and (100−X) % negative pairs, and the expected ratio of positive and negative pairs in real-world scenarios is Y % positive and (100−Y %) negative, some number of positive or negative pairs may be removed to more closely match the expected ratio. In some embodiments, such class imbalance adjustments may not be performed.

The model may then be trained using the potentially modified sorted subset of training image pairs. The process of identifying suitable positive and negative pairs, and training the model using such pairs, may be repeated for the next iteration, and the iterations may be continued until a convergence criterion is met or the resources/time available for training is exhausted. After the trained model 124 is deployed for use, respective similarity scores may be generated for various pairs of images consumed as input by the trained model, and responsive application-dependent operations may be performed if the similarity scores meet threshold criteria in some embodiments.

As suggested in FIG. 1, the processing involved in identifying suitable training image pairs may in some embodiments be performed using a separate set of execution platforms or resources than are used for training the model. For example, in one embodiment, a set of one or more CPUs may be used for the training image pair selection, while one or more GPUs may be used for the actual training. Such partitioning of the workload may enable image pair selection (for a subsequent iteration) to be performed in parallel with a current iteration of the training in some implementations. For example, in one embodiment in which such a parallelization technique is employed, a group of training image pairs to be provided as training input to the model for a subsequent iteration may be selected before at least one image pair of the training image pairs that were earlier selected for the current iteration has been provided as input to train the model.

A number of technical benefits may be obtained in various embodiments as a result of using the intelligent training image pair selection in combination with the mirrored multi-scale neural network model. The total amount of computing, storage and/or network resources used to train the model may, for example, be reduced by selecting and ordering training image pairs based on the difficulty of discriminating among the images in the pairs. Instead of having to train the model with a training data comprising hundreds of millions of image pairs, for example, a training data set of a few thousand image pairs may be sufficient when the described training data selection optimization techniques are used. The use of the multiple subnetworks with different numbers of convolution layers may increase the ability of the model to learn about a wider range of differences than if a single set of convolution layers were used in a given mirror. Overall, the combination of the two techniques may enable higher quality similarity detection results to be obtained more efficiently—e.g., more subtle differences and/or similarities between images may be identified using fewer resources than may have been required if alternative approaches were employed. In some embodiments, at least some combinations of the elements of system 100 that are shown as separate entities in FIG. 1 (such as training coordinators, run-time coordinators, image collectors, image pair selection subsystems, model training resources, pre-processors, model execution resources and the like) may be implemented using a single computing device, or each computing device of a set may be used to implement more than one of the elements shown.

Example Mirrored Neural Network Architecture for Image Similarity Analysis

Figure 2:
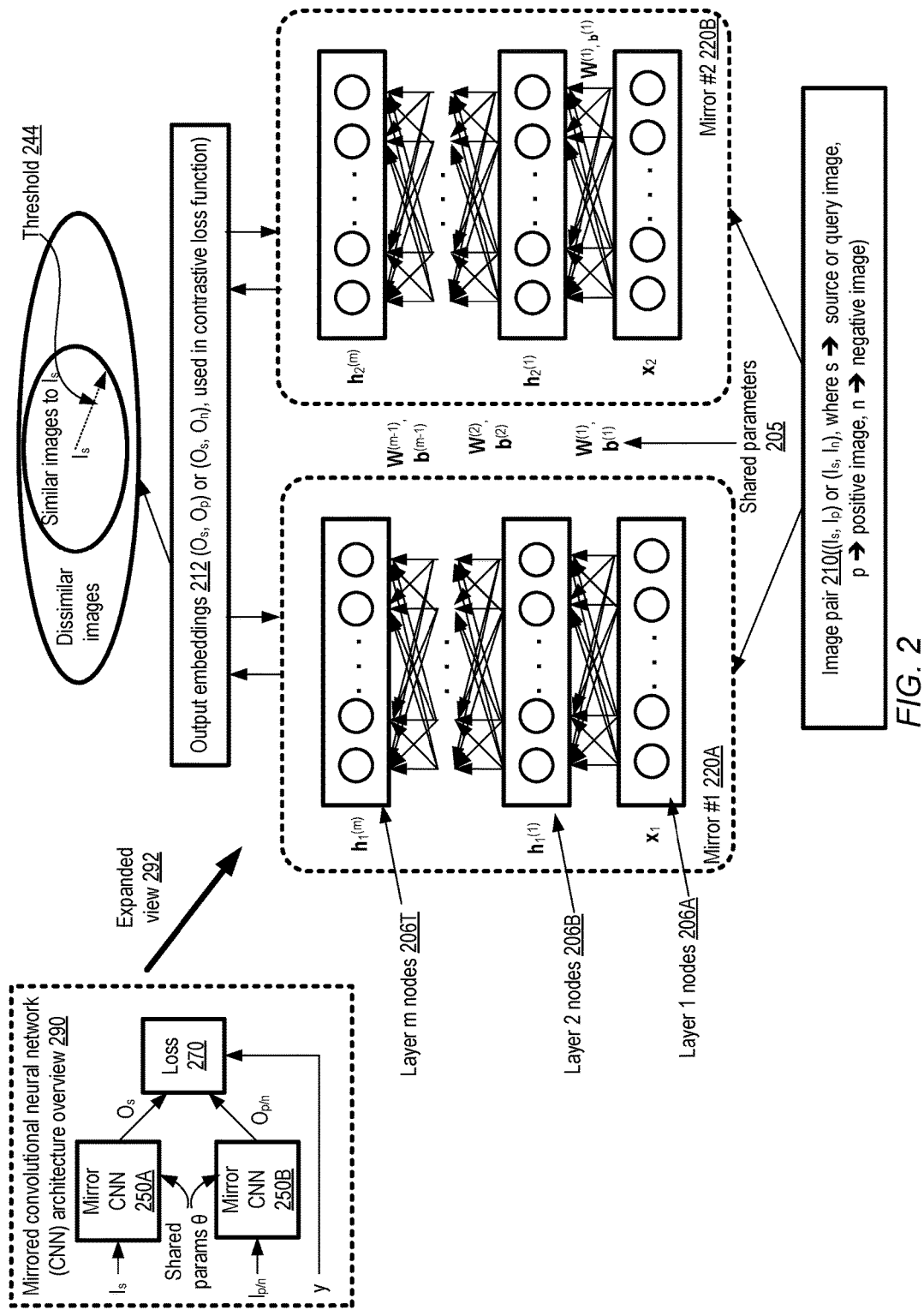
FIG. 2 illustrates an example mirrored neural network architecture which may be employed for image similarity analysis, according to at least some embodiments.

FIG. 2 illustrates an example mirrored neural network architecture which may be employed for image similarity analysis, according to at least some embodiments. An overview of a mirrored or Siamese neural network architecture 290 is shown, as well as an expanded view 292 of a model which implements such an architecture. As indicated in the overview 290, a pair of convolutional neural networks (CNNs) may be arranged as mirrors or replicas of one another. Mirror CNN 250A and mirror CNN 250B may have the same structure (e.g., the same number of nodes or artificial neurons, arranged in the same number of layers, and interconnected using the same arrangement of inter-node connections) in the depicted embodiment, and may share a set of parameters θ. That is, if and when a value of a particular parameter is modified or updated at one of the mirrors as a result of learning, the same modification may be duplicated within both mirrors. In the depicted embodiment, a respective image of an image pair may be provided as input to one of the mirror CNNs 250—e.g., a source image Is may be provided as input to mirror 250A, while a positive or negative image ($I_p$ or $I_n$) may be provided as input to mirror 250B. Each of the mirrors may generate an output vector learned from its input image in the depicted embodiment—e.g., a vector Os may be generated by mirror 250, while a vector $O_p$ or $O_n$ may be generated by mirror 250B. A loss function 270 may be calculated based on the output vectors and a label y indicating whether the input image pair was a positive (similar) pair or a negative (dissimilar) pair in some embodiments.

In the expanded view 292, internal layers of the mirrors 220A and 220B are shown. The inputs to the first layer are labeled $x_1$ and $x_2$ respectively for the two mirrors. At each successive layer of the model (which may comprise a different number of nodes than other layers), a respective output h may be generated. For example, Layer 1 nodes 206A may generate an output $h_1^{(1)}$ at mirror #1 220A, and $h_2^{(1)}$ at mirror #2 220B, layer 2 nodes may generate output $h_1^{(2)}$ at mirror #1 and $h_2^{(2)}$ at mirror #2, and so on. At layer (m−1), output $h_1^{(m)}$ and $h_2^{(m)}$ may be generated. Parameters such as weights W and biases b (e.g., $W^{(1)}, W^{(2)} \ldots, W^{(m-1)}$, $b^{(1)}, b^{(2)}, b^{(m-1)}$) may be shared between the mirrors in the depicted embodiment, as indicated by label 205. The input image pairs 210 to the mirrors may comprise either a positive pair ($I_s, I_p$) or a negative pair ($I_s, I_n$), with individual images of a pair being processed at different mirrors in the depicted embodiment. The outputs of the mirrors, generated at Layer m nodes 206T, may comprise a pair of vector embeddings ($O_s$, $O_p$) (corresponding to a positive input image pair) or ($O_s$, $O_p$) corresponding to a negative input image pair). Each of the output embeddings may comprise, for example, a vector of some selected length (such as 4096 entries or 1024 entries), which may in some embodiments represent a much smaller dimensionality of values than the raw input image itself (which may for example comprise a matrix of size Width×Height pixels). A contrastive loss function may be used in some embodiments to update the shared parameters of the model after each image pair or mini-batch of image pairs is processed. In at least one embodiment, a contrastive loss function of the following form may be employed at the mirrored CNN model:

$$L(\theta)=(1-Y)(\tfrac{1}{2})D(O_s,O_p)^2+Y(\tfrac{1}{2})\{\max(0,m-D(O_s,O_n)\}^2 \quad \text{Loss function equation (1):}$$

In equation (1), Y is the image pair label, set to 0 for positive or similar pairs, and set to 1 for negative or dissimilar pairs (note that the opposite labels, 1 for positive and 0 for negative, may be employed in some embodiments, and the corresponding summation terms of equation (1) may be modified accordingly). $D(O_i, O_j)$ represents a distance metric (e.g., Euclidean, Manhattan or cosine distance) between two output vectors $O_i$ and $O_j$, and m is a margin hyperparameter of the model. When a positive input pair is processed, Y is zero, so the second additive term involving the maximum is also zero, and the loss becomes the distance between the embeddings of two similar images. As such, the model learns to reduce the distance between similar images, which is a desirable result. When the images are dissimilar, Y is one, so the additive term involving (1−Y) is zero, and the loss in effect becomes the hinge loss corresponding to the additive term involving the maximum. If the two images are very dissimilar, the maximum function returns zero, so no minimization may be required. However, depending on the selected value of the m hyperparameter, if the images are not very dissimilar, a non-zero error value may be computed as the loss. A larger value of m would tend to push similar and dissimilar image embeddings further apart in embodiments in which the loss function shown above is used. In at least some embodiments, m may be set to a value (such as 1) based on empirical analysis of the quality of the results obtained, and/or based on a knowledge base entry accessible at the image analytics service. In some embodiments, other loss functions may be employed. After the model has been trained, the outputs generated by the mirrored model may be used to classify images as dissimilar to the source image $I_s$ in the depicted embodiment, depending for example on a distance threshold 244 between $O_s$ and the output generated for a given other image. In some embodiments, the output embeddings for various images by the trained model may be saved in a repository similar to processed image repository 175, so that at least some images do not necessarily have to be re-processed after they have been analyzed once using the trained model.

Example Multi-Scale Convolutional Neural Network

Figure 3:
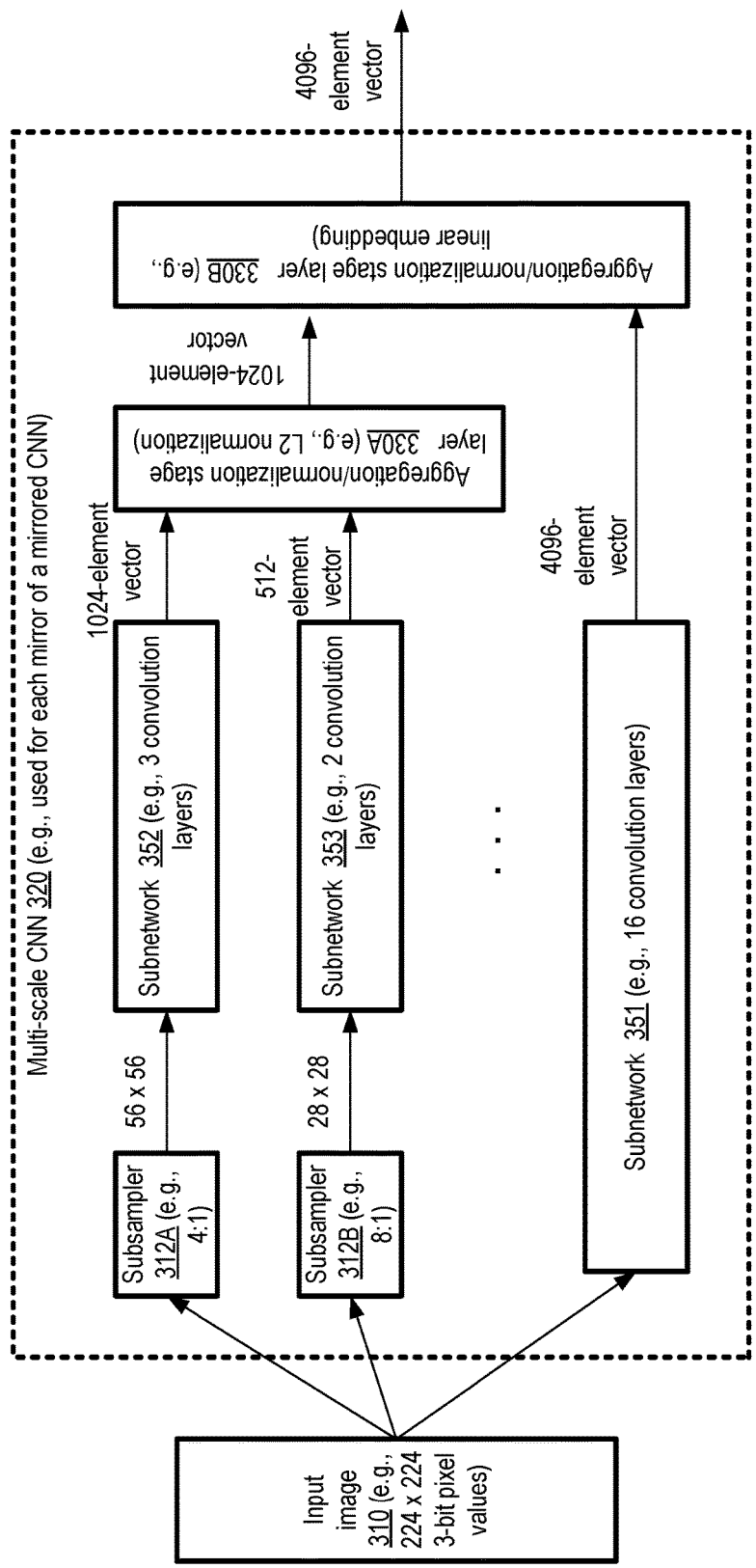
FIG. 3 illustrates an examples of a multi-scale convolutional neural network which may be used at each of the mirror networks of an image similarity analysis model, according to at least some embodiments.

As mentioned earlier, in at least some embodiments, a multi-scale neural network model in which different numbers of convolution layers are configured for respective subnetworks may be employed. FIG. 3 illustrates an examples of a multi-scale convolutional neural network which may be used at each of the mirror networks of an image similarity analysis model, according to at least some embodiments. As shown, multi-scale CNN 320 may comprise at least three convolution subnetworks in the depicted embodiment: subnetworks 351, 352 and 353, with 16, 3 and 2 convolution layers respectively. In a mirrored configuration such as that shown in FIG. 2, in at least some embodiments each of the mirrors may comprise one copy of each of the subnetworks.

Generally speaking, a convolutional neural network or subnetwork used for image processing may combine the concepts of local receptive fields, shared or replicated weights, and spatial or temporal sub-sampling. A subnetwork may comprises a number of layers, each comprising some number of nodes or neurons, such as convolution layers, pooling or sub-sampling layers, and/or fully-connected layers. With respect to the convolution layers and the pooling layers, a given layer comprises a number of units (logically representing respective artificial neurons being trained), with each unit receiving input from a small set of units located in a common neighborhood in the previous layer. This approach towards local receptive fields is modeled on the manner in which the neurons of the visual system of various animal species work. With such local information, the neurons at a given layer may eventually learn to recognize elementary visual features such as corners, endpoints, boundaries, etc. Such elementary features may then be combined in subsequent layers of the model to form higher-order features (e.g., doors, windows, etc. in the case of an image of a house). Elementary feature detectors useful in one part of an image may be equally useful in detecting similar features in other parts of the image, so sets of units assigned different parts of the image within a given layer may be assigned identical weights in at least some embodiments. A convolution layer may comprise several filter maps with respective weight vectors, so that several different types of features may be extracted at the convolution layer. The receptive fields of nearby units may overlap, again mimicking the manner in which the receptive fields of biological neurons overlap.

Once a feature has been detected, its absolute position within the image being analyzed may become less important than the approximate relative position of that feature with respect to other detected features. For example, if a mouth is detected as a feature of a human face, its position relative to the nose and eyes may be more important than the exact location of the mouth within the image. In fact, keeping track of the precise positions of different visual features may actually be detrimental to recognizing higher-level objects, because the precise positions of the features may vary across different images. Pooling layers may be used to reduce the precision with which the positions of various identified features are represented in the filter maps. For example, the maximum or average output of some number of neighboring units of the filter maps of the previous convolution layer may be computed at the filter maps of the pooling layers. Successive layers of convolution and pooling layers may be alternated in the subnetwork in some embodiments, for example with the number of filter maps increasing in each layer and the spatial resolution decreasing in each layer.

As different numbers of convolution layers are used in the three subnetworks 351, 352 and 353, the granularity at which features are recognized or learned may differ in the three subnetworks in the depicted embodiment. As shown, in some embodiments, an input image may be subsampled before being provided as input to one or more of the subnetworks. For example, sub-sampler 312A may use a 4:1 sampling ratio to convert an input image 310 comprising 224×224 pixels into a 56×56 pixel sample used as input to the subnetwork 352, while sub-sampler 312B may use a 8:1 sampling ratio to convert the 224×224 pixels into a 28×28 pixel sample used as input to the subnetwork 353 in the depicted embodiment. The input image may not be sub-sampled for one or more of the subnetworks (as in the case of subnetwork 351) in some embodiments; in at least one embodiment, none of the subnetworks may use sub-samples of the image as input.

In at least some embodiments, the subnetworks may generate output vectors or embeddings of different lengths. For example, as shown, subnetwork 351 may emit a 4096-element vector embedding, subnetwork 352 may produce a 1024-element vector, while subnetwork 353 may generate a 512-element vector, with each of the vectors representing features of the same input image as learned by the respective subnetworks. The CNN 320 may be referred to as a multi-scale CNN because convolution at different scales (using respective numbers of convolution layers) may be performed on the same input image, resulting in different output feature vectors which may have to be aggregated or combined to generate the final output of the model as a whole. In at least some embodiments, one or more aggregation or normalization layers or stages may be used in the multi-scale CNN. As shown, the 512-element output vector produced at subnetwork 353 may be provided as input to aggregation/normalization stage layer 330A (an L2 normalization layer in the depicted embodiment) along with the 1024 element vector generated at subnetwork 352, producing an output vector also of length 1024. That 1024-element vector output of aggregation/normalization stage layer 330A may be provided as input to a second aggregation/normalization stage layer 330B (e.g., a linear embedding layer), together with the 4096-element vector produced by subsystem 351, generating the final 4096-element vector output of the multi-scale CNN in the depicted embodiment.

It is noted that the configuration and sizes for various components and artifacts of a multi-scale CNN used in various embodiments may differ from those shown by way of example in FIG. 3. For example, the sizes of the input image representations, the number of subnetworks, the number of convolution layers at individual ones of the subnetworks, the sampling ratios (if sampling is used at all), the lengths of the vectors, and/or the number and types of aggregation/normalization layers may differ in some embodiments from those shown in FIG. 3.

Example Resource Partitioning and Parallelism Scenario

Figure 4:
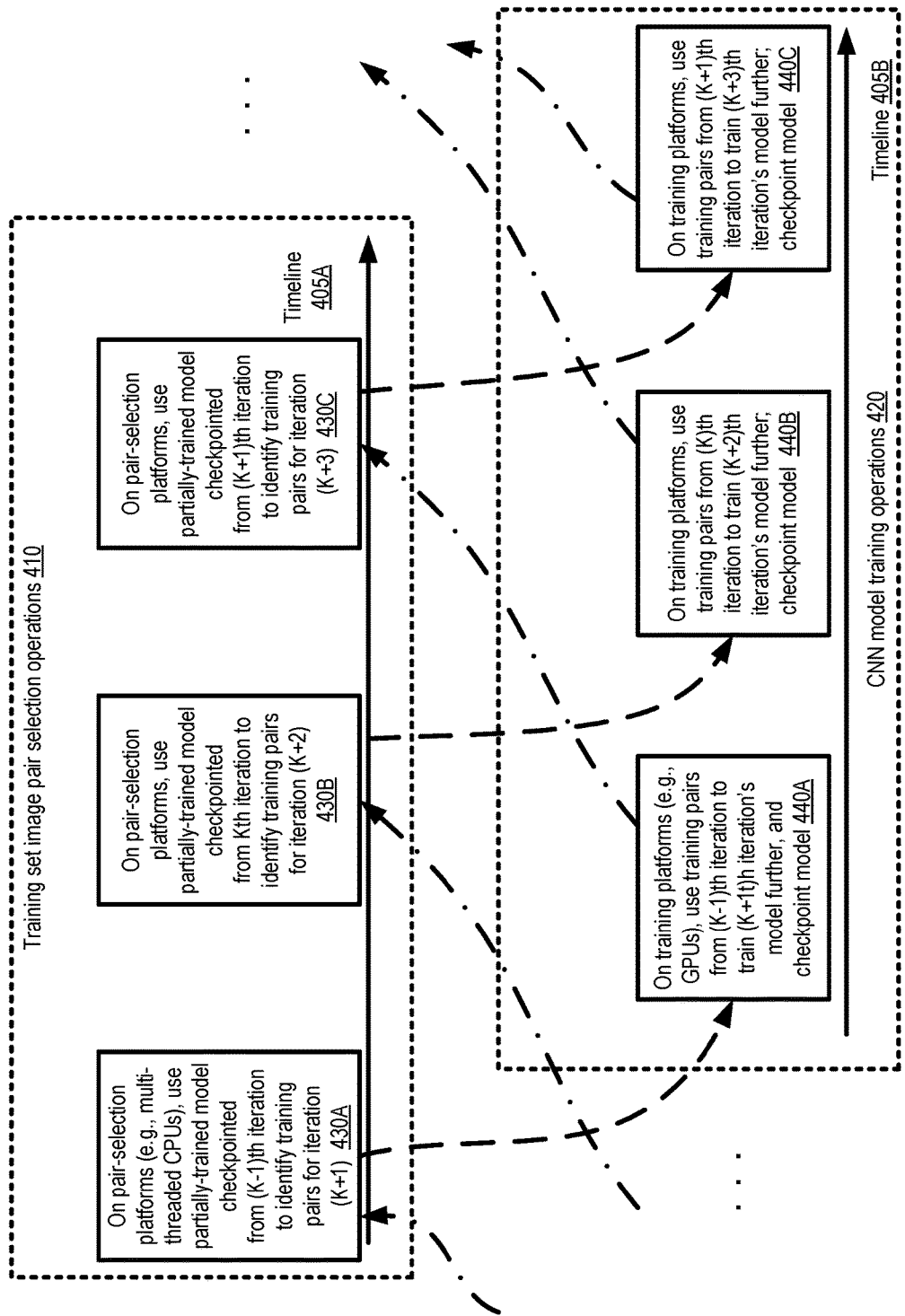
FIG. 4 illustrates an example scenario in which operations used to identify selected training image pairs may be performed on a separate set of resources than the resources used to train a convolutional neural network model iteratively, according to at least some embodiments.

FIG. 4 illustrates an example scenario in which operations used to identify selected training image pairs may be performed on a separate set of resources than the resources used to train a convolutional neural network model iteratively, according to at least some embodiments. In the depicted example scenario, timeline 405A illustrates operations 410 that may be performed to select training set image pairs, while timeline 405B indicates operations 420 that involve the actual training of the model (e.g., using stochastic gradient descent or some other similar algorithm).

As indicated in element 430A, a partially-trained model, which may have been saved or checkpointed to persistent storage in a $(K-1)^{th}$ iteration of training may be executed at pair-selection execution platforms (e.g., comprising one or more multi-threaded or single-threaded CPUs) to identify training image pairs to be used in the $(K+1)^{th}$ training iteration. In iteration (K+1), as shown in element 440A, a different set of resources referred to as training execution platforms (e.g., comprising one or more GPUs) may be used to train the model, using the training image pairs identified at the pair-selection platforms in operations corresponding to element 430A. After the operations corresponding to element 440A are completed, a version of the partially-trained model from the $(K+1)^{th}$ iteration may be checkpointed or saved, and may be used in operations corresponding to element 430C to identify training image pairs for a later training iteration.

In some embodiments, at least partially in parallel with the operations of element 440A, a checkpointed version of the model from the $K^{th}$ training iteration may be used to identify training image pairs for iteration (K+2), as illustrated in element 430B. Since different platforms may be employed for the image pair selection operations, it may be the case that at least some of the training image pairs of a current training iteration (e.g., K+1) have not yet been processed at the training platforms, when at least some training image pairs to be used for a subsequent iteration (e.g., K+2) have already been identified. The pattern of alternation of the image selection operations with the training operations using different platforms for the two types of operations may be repeated, e.g., as indicated in elements 430C, 440B and 440C. Note that as each training iteration is completed, the versions of the partially-trained model that are saved or may be expected to improve in quality; as a consequence, the quality of the training image pairs selected using the partially trained models may also improve in at least some embodiments as the training proceeds. Further details regarding the manner in which the partially-trained models may be used to help select the training image pairs for subsequent training iterations are provided below. In at least some embodiments, the type of resource partitioning illustrated in FIG. 4 may not be employed—e.g., the same set of execution platforms may be employed for training image pair selection as well as for model training itself.

Border-Zone Images

Figure 5:
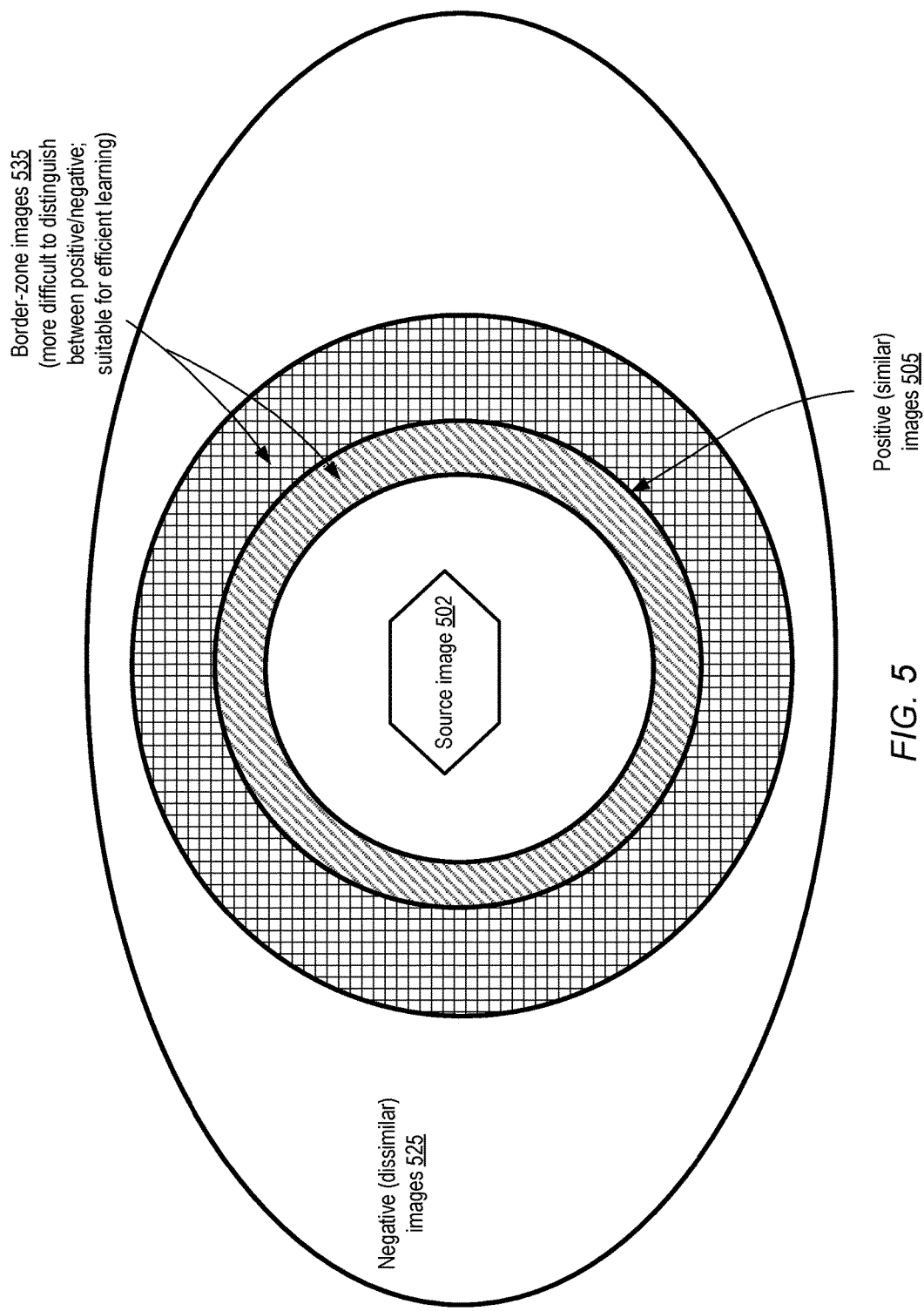
FIG. 5 illustrates the concept of a border zone between positive (similar) images with respect to a particular source image, and negative (dissimilar) images, such that image pairs which include a border-zone image may be more helpful than other image pairs when training image similarity analysis models, according to at least some embodiments.

FIG. 5 illustrates the concept of a border zone between positive (similar) images with respect to a particular source image, and negative (dissimilar) images, such that image pairs which include a border-zone image may be more helpful than other image pairs when training image similarity analysis models, according to at least some embodiments. The intuition behind this reasoning is that if it is too easy to distinguish between two images of a given image pair, because the images are dramatically different, the model would not learn very much from examining and processing that image pair. Similarly, if it is too easy to tell that two images of a given pair are similar, again the model may not learn much from examining that image pair. Images that are not too easy to distinguish, and not too easy to characterize as being similar, may be expected to provide the most effective learning in at least some embodiments In FIG. 5, a source image 502 is shown within a large two-dimensional space of images, with images that lie closer to 502 in the two-dimensional space assumed to be more similar to the source image, and images that lie further away assumed to be more dissimilar to the source image. Two dimensions are used to simplify the presentation of the border-zone concept; in practice, in various embodiments, a much larger set of dimensions may be considered when determining image similarity. In the simplified example scenario shown, images that lie within circle 505 may be considered positive or similar images with respect to the source image 502, and images that lie outside the circle 505 (e.g., within the ellipse 525 but outside the circle 505) may be considered negative or dissimilar. A border-zone region 535, just outside (and just inside) the circle 505, corresponding to the filled-in portions of FIG. 5, may include the images that when paired with source image 502, are harder to classify as positive or negative with respect to the source image (compared to images in other parts of the two-dimensional space). As such, images in the border zone 535 may be more helpful for model training/learning than images that are not in the border zone. This intuition may underlie the use in various embodiments of a training image pair selection algorithm, inspired by curriculum learning, whose pseudo-code is provided below. The algorithm may be referred to as an online pair mining algorithm in some embodiments, as the image pairs may be considered as being mined or selected from among a larger set of alternatives, and as the selection of the image pairs may be done in online mode (e.g., in parallel with the training iterations as discussed above in the context of FIG. 4) rather than an offline mode (when training is not performed in parallel).

Training Image Pair Selection (TIPS) Algorithm Pseudo-Code

Require: numEpochs, numMiniBatches, pruningMargin
1: step=1/numEpochs
2: λ=0
3: for e in 1:numEpochs do
4: λ+=step
5: for b in 1:numMiniBatches do
6: postivePairs=generatePositivePairs(b)
7: negativePairs=generateRandomNegativePairs(b)
8: selectedPairs=optimizedSelect(positivePairs, negativePairs,
9: pruningMargin, λ)
10: trainModel(selectedPairs)
11: endfor
12: endfor
13: procedure optimizedSelect(positivePairs, negativePairs, λ)
14: getDistancesFromPartiallyTrainedModel(positivePairs, negativePairs)
15: sortPairsByDistance
16: prunePairsUsingMargin(pruningMargin)
17: weightedRandomSample(negativePairs, λ)
18: adjustRemainingPairs
19: return adjustedPairs
20: end procedure As shown in the pseudo-code, in some embodiments, the requirements for the training image pair selection algorithm may include a setting for the number of epochs of training (numEpochs), the number of mini-batches of training to be performed per epoch (numMiniBatches), and a pruning margin (pruningMargin) to be used to filter out some image pairs as discussed below. In line 1, a step parameter may be initialized as a function of the number of epochs. A parameter λ, used to weight random samples such that more difficult negative pairs are used as the epoch count increases, whose value increases as more epochs are completed may be initialized in line 2. The outer for loop from line 3 to line 12 may be performed for each epoch in some embodiments, while the inner for loop from line 5 to line 11 may be performed for each mini-batch within a given epoch. In line 4, the value of λ may be increased by the value of step determined in line 1.

In the inner for loop, an initial set of positive image pairs and an initial set of negative image pairs may be obtained. The functions/procedures generatePositivePairs and generateRandomNegativePairs may be application-dependent in at least some embodiments—that is, respective versions of these functions may be generated for different applications for which image similarity analysis may be performed. As indicated by the inclusion of the string "Random" in the function used to identify the initial set of negative image pairs, random selection from a collection of images may be used in some embodiments to obtain the negative or dissimilar pairs. In some embodiments, as mentioned earlier, new images which are slight variants of selected source images may be generated or synthesized to obtain at least some initial positive pairs in various embodiments. From among the initial candidate positive and negative pairs, an optimized subset may be selected or mined using the optimizedSelect procedure or function in some embodiments, and then that optimized subset may be used to train the model further for the current mini-batch in the inner for loop.

In the optimizedSelect procedure, in operations corresponding to line 14 (getDistancesFromPartiallyTrainedModel), intra-pair distance measures may be obtained for the candidate positive and negative image pairs, e.g., using a checkpointed, partially-trained version of the model which was saved at the end of an earlier iteration or mini-batch in some embodiments. Those distance metrics may then be used to sort the positive and negative candidate image pairs in operations corresponding to line 15 (sortPairsByDistance), e.g., in order of decreasing intra-pair distance, and therefore in order of increasing degree of image pair discrimination difficulty. Note that at the start of the training, a partially trained model may of course not be available, so for the first time (or for the first two times) that training image pairs are selected, they may be arranged randomly in operations corresponding to line 15 in some embodiments.

In operations corresponding to line 16 (prunePairsUsingMargin), the following equation or inequality constraint may be used to prune some of the sorted pairs in some embodiments:

$$\mathrm{argmax}\{D(O_s, O_p)^2\} + \mathrm{pruningMargin} < \mathrm{argmin}\{D(O_s, O_n)\}^2 \quad \text{Pruning equation (2):}$$

The same notation is used in equation 2 as was discussed earlier: the subscripts s, p and n refer to the source image, a positive (similar) image and a negative (dissimilar) image, respectively, and D denotes the distance between images. Only those candidate pairs which meet the inequality in equation (2) may be retained after the operations corresponding to line 15 are completed. The pruning margin may thus represent another example image discrimination difficulty criterion in embodiments in which the pruning equation (2) is employed. In various embodiments, at least some false positive image pairs may be removed as a result of such operations.

In operations corresponding to line 17 (weightedRandomSample), in at least some embodiments, one or more additional negative image pairs may be removed from the remaining candidates using weighted random sampling. The parameter λ, whose value increases as the number of epochs completed increases, may be passed to the sampling function and used as a weight (or used to generate a weight), such that more difficult negative image pairs (i.e., negative image pairs with smaller distances between the images of the pairs) tend to have a higher probability of getting sampled later on in the training.

In some embodiments, in operations corresponding to line 18 (adjustRemainingPairs) an additional set of adjustments may be made to the set of candidate training image pairs which remain at the end of the weighted random sampling operations. In one such embodiment, for example, if there is an expected ratio of positive and negative image pairs in the application for which image analysis is being performed, and the ratio in the set of image pairs that have been selected thus far is significantly different from that expected ratio, some positive and/or negative pairs may be removed to bring the two ratios closer together. In effect, in operations corresponding to line 18, a class imbalance criterion may potentially be used to exclude or include some of the remaining image pairs in various embodiments. An adjusted sorted set of image pairs may be returned in operations corresponding to line 19, and used as the training image pairs for the mini-batch under consideration.

In some embodiments, as discussed above in the context of FIG. 4, the operations of the TIPS algorithm other than the actual training of the model (trainModel) may be performed using a different set of resources than are used for the model training. Such an approach may enable parallelism between training image pair selection and the mode training itself: e.g., one set of training image pairs, to be used for a future iteration of training, may be selected in parallel with a current training iteration of the model. It is noted that in some embodiment, the operations performed to identify training image pairs may differ from those indicated in the TIPS pseudo-code—e.g., mini-batching may not be used, one or more of the optimization steps in the optimizedSelect procedure may differ from those shown in the pseudo-code, and so on. In embodiments in which mini-batching is not used, while other aspects of the TIPS algorithm shown are not modified, the net effect may be the same as if numMiniBatches is set to one.

As indicated in the pseudo-code provided above, curriculum learning may be employed at more than one stage—e.g., during the pruning, and then during the weighted random sampling. FIG. 6 illustrates an overview of the use of curriculum training methodologies during image similarity model training at two levels: an intra-iteration level, and an inter-iteration level, according to at least some embodiments. In intra-epoch curriculum learning 602, within a given epoch or iteration, training example image pairs for a given mini-batch or batch may be sorted (e.g., via the sortPairsByDistance function/procedure of the example pseudo-code above) and pruned (e.g., via the prunePairsUsingMargin function/procedure) based on increasing degree of image pair discrimination difficulty, as indicated in element 610. Furthermore, across epochs, an epoch-count-dependent parameter such as A may be used to further sample or reduce the image pairs to be used for training, based again on increasing image pair discrimination difficulty (element 610). This latter technique may represent one example of inter-epoch curriculum learning 602 in various embodiments. If, for example, a λ parameter whose value changed with each epoch of training were not used, the degree of discrimination difficulty of the training image pairs would not necessarily increase as more epochs were completed.

Semantic and Visual Image Similarity

Figure 7:
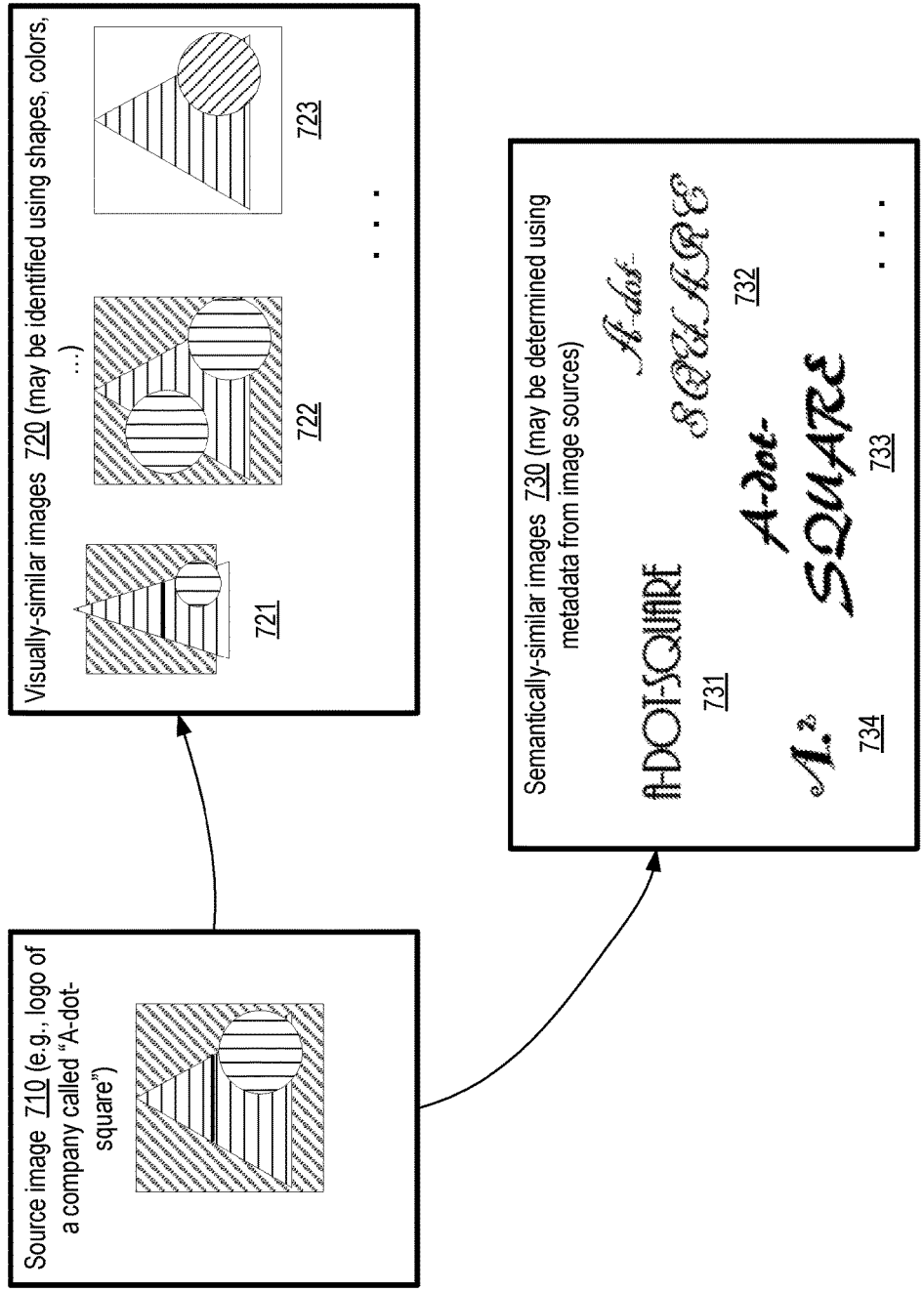
FIG. 7 illustrates examples of two types of image similarity (visual similarity and semantic similarity) which may be relevant for some applications, according to at least some embodiments.

As mentioned earlier, more than one type of similarity among images may be taken into consideration in some embodiments. FIG. 7 illustrates examples of two types of image similarity (visual similarity and semantic similarity) which may be relevant for some applications, according to at least some embodiments.

In the depicted embodiment, a source image 710 may represent a graphical logo of a company. By way of example, assume that the company name is "A-dot-square". In the source image 710, the triangle with a darker horizontal line approximately midway between the apex and the base may represent the "A" of the company's name, the circle may represent the "dot", and the square within which the circle and triangle are placed may represent the "square". When considering whether some other image is similar to image 710, at least two types of factors may be taken into account in the depicted embodiment: (a) the extent to which the second image resembles the source image 710 in terms of its visual elements (shapes, colors, etc.) and/or (b) the extent to which the second image also potentially indicates the company's name "A-dot-square", even if the second image does not visually resemble the image 710. The first type of similarity may be referred to as visual similarity, while the second type of similarity may be referred to as semantic similarity in various embodiments.

Three examples 720 of images that are visually similar to source image 710, and may therefore be identified in an automated fashion based on shape boundaries, colors, and the like are included in FIG. 7. Image 721 comprises a triangle and a circle with a background square of the same color as in image 710, but the relative width and height of the triangle may differ somewhat from the relative width and height of the triangle in image 710. In the case of image 722, the shapes and relative sizes of the triangle and the square may be very similar with respect to image 710, but two circles may be present instead of one. In image 723, the shapes and positions may be similar to those of image 721, but the color or shading of the square may be different from that in image 710.

Four examples of semantically-similar images 730 are shown in FIG. 7. In the each of the example images 731, 732 and 733, the text string "A-dot-square" is presented using different types of fonts and different capitalization. In image 734, an "A" is present, but the "dot" part is represented by a period symbol, and the "squared" part is represented by a numeral "2" in a superscript position. In at least some embodiments, it may be possible to determine that two images are semantically similar to one another based on analysis of semantic metadata extracted or inferred from image sources—e.g., if the image 731 is present on the same web page of the "A-dot-square" company as image 711 and are both used to refer to the company in some way, the fact that both images are supposed to represent the company may be determined automatically. Depending on the particular application for which image similarity is being used, labels based on visual similarity and/or semantic similarity may be used to train the machine learning model(s) in some embodiments. For example, in the case of an application in which a service is to provide similar images to a source image indicated by a service client, a machine learning model may be trained using both semantic and visual similarity labels. As a result, in such a scenario, if an image similar to 711 is submitted by a client to the service, images from set 730 as well as 720 may be provided in response.

Example Provider Network Environment

Figure 8:
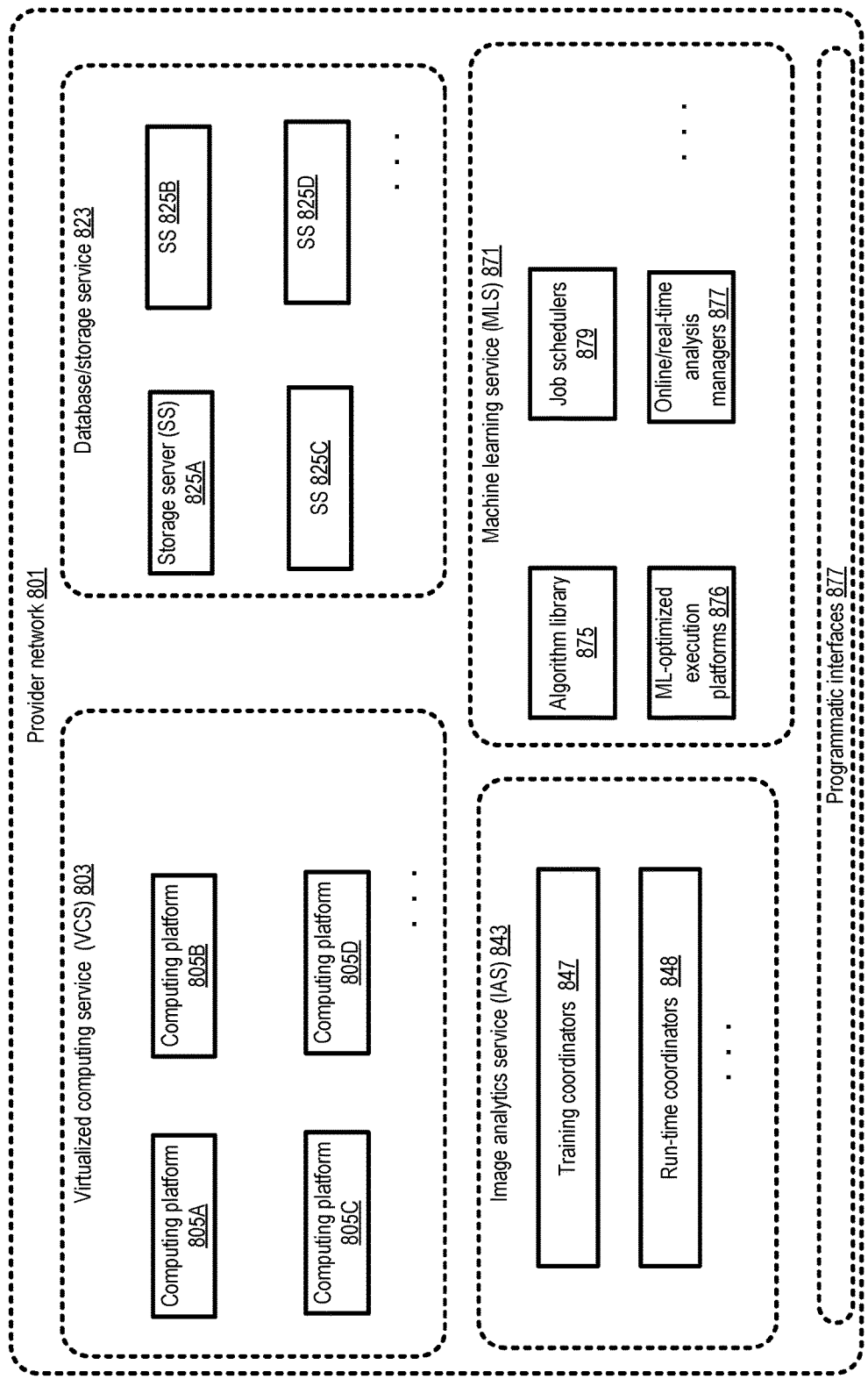
FIG. 8 illustrates an example provider network environment at which an image analytics service may be implemented, according to at least some embodiments.

In some embodiments, the techniques discussed above for image similarity analysis may be implemented at least partly at a provider network. FIG. 8 illustrates an example provider network environment at which an image analytics service may be implemented, according to at least some embodiments. Networks set up by an entity such as a company or a public sector organization to provide one or more network-accessible services (such as various types of cloud-based computing, storage or analytics services) accessible via the Internet and/or other networks to a distributed set of clients may be termed provider networks in one or more embodiments. A provider network may sometimes be referred to as a "public cloud" environment. The resources of a provider network may in some cases be distributed across multiple data centers, which in turn may be distributed among numerous geographical regions (e.g., with each region corresponding to one or more cities, states or countries, sometimes in different time zones).

In the depicted embodiment, provider network 801 may comprise resources used to implement a plurality of services, including for example a virtual computing service (VCS) 803, a database or storage service 823, a machine learning service (MLS) 871 and an image analytics service (IAS) 843. In some embodiments, the IAS may be implemented as part of the MLS 871, instead of being configured as a separate service as shown in FIG. 8. Components of a given service may utilize components of other services in the depicted embodiment—e.g., for some machine learning tasks, a component of the machine learning service 871 may utilize virtual machines implemented at computing platforms such as 805A-805D of the virtualized computing service. Input data, intermediate results, final results and/or other artifacts of various machine learning algorithms or models, such as those used for image similarity may be stored at storage servers 825 (e.g., 825A-825D) of the database or storage service 823 in some embodiments. Individual ones of the services shown in FIG. 8 may implement a respective set of programmatic interfaces 877 which can be used by external and/or internal clients (where the internal clients may comprise components of other services) in the depicted embodiment.

As shown, the image analytics service 843 may comprise, among other components, one or more training coordinators 847 and one or more run-time coordinators 848 in the depicted embodiment. The training coordinators 847 may, for example, invoke algorithms selected from the machine learning algorithm library 875 to select training image pairs and train one or more models used for image similarity analysis in the depicted embodiment. In some embodiments, requests to train some types of machine learning models may be handled as batch jobs at the machine learning service, and a batch job scheduler 879 may orchestrate the allocation of resources for the jobs as well as dependencies among jobs. In the depicted embodiment, online/real-time analysis managers 877 of the MLS 871 may be responsible for executing the algorithms used to generate image similarity scores after the models have been trained. In at least one embodiment, a machine learning service 871 may have access to or include a set of execution platforms 876 that are optimized for machine learning tasks (e.g., platforms that have customized hardware such as GPU arrays and/or customized software stacks). Depending on the suitability of such platforms for transaction deferral-related tasks, one or more execution platforms 876 may be employed by the image analytics service 843 in the depicted embodiment. For example, as mentioned earlier, the training of the models may be performed using GPUs in some embodiments, while the selection of the training image pairs may potentially be performed using different execution platforms. In one embodiment, a collection of images (or image pairs) as well as intermediate and/or final results of analysis of the images (such as the kinds of vectors produced using neural network models discussed above) may be stored at a storage service 823.

In at least some embodiments, at least a portion of the work involved in training and executing machine learning models for image analysis may be accomplished using non-specialized computing platforms of the virtualized computing service 803. In one embodiment, the techniques described above for image similarity analysis may be implemented without acquiring resources of network-accessible services such as those shown in FIG. 8. For example, a standalone tool or tools implemented at one or more computing devices which are not part of a network-accessible service may be used in some embodiments.

Figure 9:
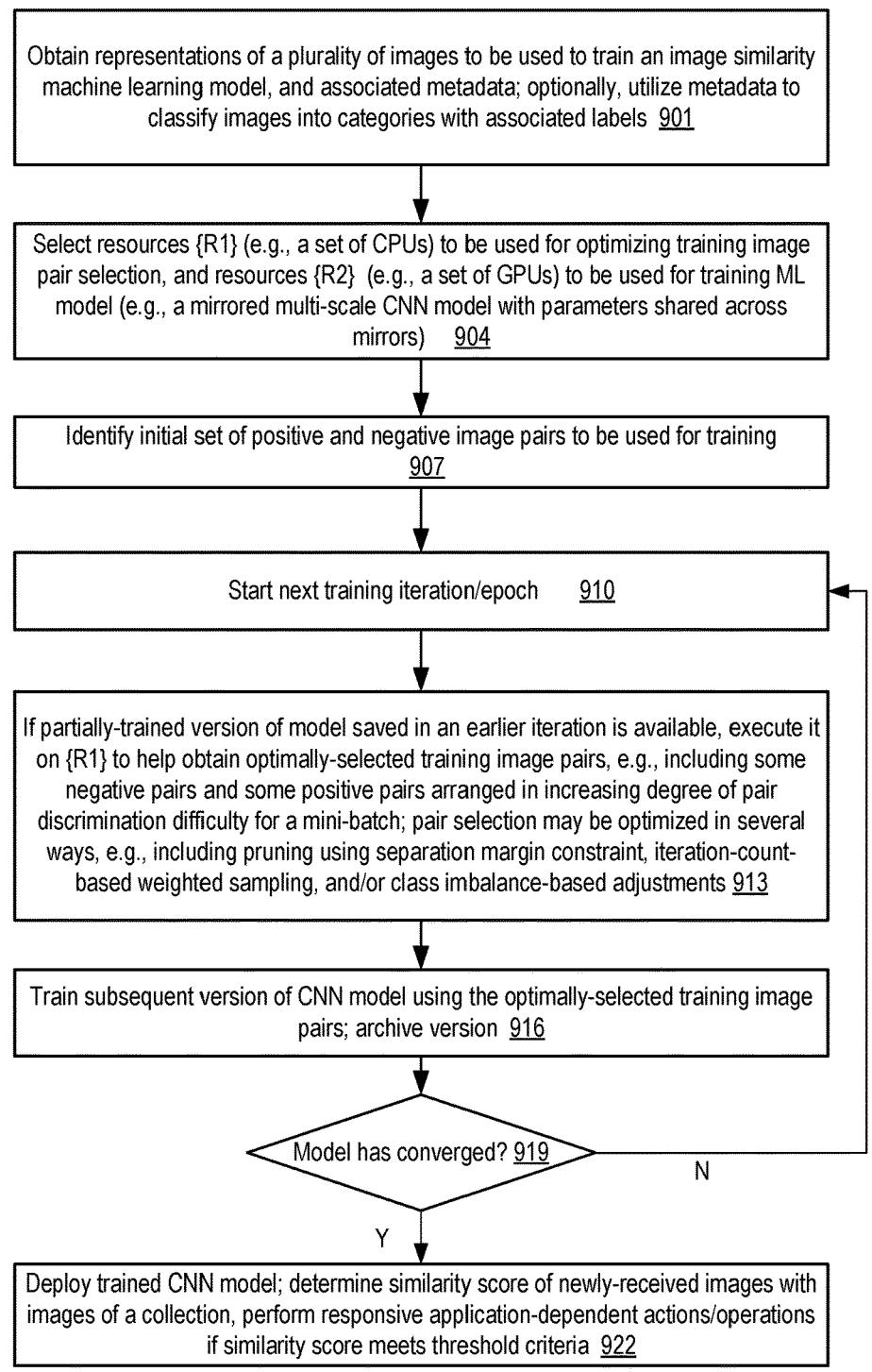
FIG. 9 is a flow diagram illustrating aspects of operations that may be performed to estimate the similarity between images using a combination of machine learning techniques, according to at least some embodiments.

Methods for Image Similarity Analysis Using Curriculum Learning and Multi-Scale CNNs FIG. 9 is a flow diagram illustrating aspects of operations that may be performed to estimate the similarity between images using a combination of machine learning techniques, according to at least some embodiments. As indicated in element 901, representations of a plurality of images to be used to train an image similarity machine learning model may be obtained together with associated metadata. A number of image sources, such as publicly-accessible web sites, online image collections, and the like may be used in different embodiments. Optionally, in some embodiments, metadata associated with the collected images may be used to classify images into categories with associated labels. In at least one embodiment, semantic metadata (indicative of the probable meanings associated with the images) may be used to designate some images as similar to one another (and include pairs of such images among positive image pairs), e.g., even if the images to not visually resemble each other, as discussed in the context of FIG. 7.

As shown in element 904, a set of resources {R1} (e.g., a set of CPUs) to be used for optimizing training image pair selection may be identified, and another set of resources {R2} (e.g., a set of GPUs) to be used for training the machine learning model (e.g., a mirrored multi-scale CNN model with parameters shared across mirrors) may also be identified in some embodiments. It is noted that in at least one embodiment, the same set of resources may be used for both types of operations.

An initial set of positive and negative image pairs to be used for training the model may be identified (element 907). The training iterations or epochs may then be initiated. In the depicted embodiment, at the start of a given training iteration or epoch (element 910), a determination may be made as to whether a partially trained version of the model was saved in an earlier iteration.

If such a partially-trained version of model saved in (or at the end of) an earlier iteration is available, that version of the model may be run on the resource set {R1} to help obtain optimally-selected training image pairs in the depicted embodiment (element 913). Such image pairs may include some negative pairs and some positive pairs arranged in increasing degree of pair discrimination difficulty for a given mini-batch of the training in some embodiments, as discussed in the context of the TIPS algorithm pseudo-code above. Training image pair selection may be optimized in any of several ways in various embodiments as indicated in the TIPS algorithm pseudo-code, e.g., including pruning using a separation margin constraint, iteration-count-based weighted sampling, and/or class imbalance-based adjustments.

A subsequent version of the model may then be trained using the optimized training image pairs (element 916). In at least some embodiments, after each iteration of training or after each mini-batch, the model may be checkpointed or saved, and such saved versions may be used to select image pairs for further iterations. Note that model versions need not necessarily be saved after each min-batch or after each epoch in some embodiments, instead, for example, model versions may be saved after some number of mini-batches or epochs. In such embodiments, several sets of optimized training image pairs may be generated using the same saved version of the model, and then used for training respective newer versions of the model.

If, after a given iteration or mini-batch, the model has converged or reached a desired quality of results, as determined in operations corresponding to element 919, the fully-trained version of the model may be saved. The trained model may then be deployed to a run-time execution environment (element 922). Similarity scores of newly-received images with the images of existing or previously-examined collections may be generated using the trained model, and application-dependent responsive actions or operations may be taken in various embodiments. For example, in a scenario in which apparent violations of image use policies are being detected using the scores (as when an image very similar to the logo of one organization is being used for a purpose that has not been approved by the organization), the violating entities may be identified and/or contacted regarding potential improper use of the images. If the model has not converged (as also detected in operations corresponding to element 919), the operations corresponding to elements 910, 913, 916 and 919 for the next round of training image pair selection followed by model training may be performed in the depicted embodiment.

Classification for Image Similarity Analysis

Figure 10:
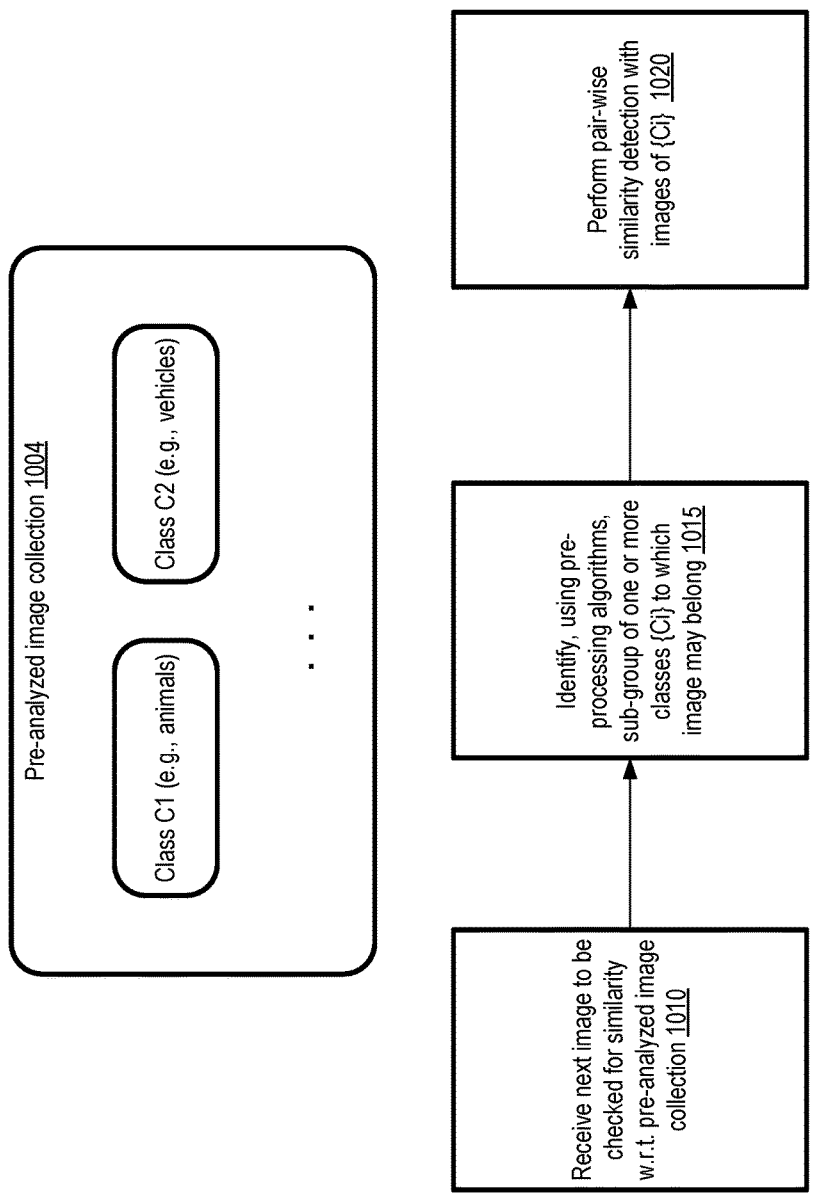
FIG. 10 illustrates a high-level overview of the use of pre-classified images for some types of image similarity applications, according to at least some embodiments.

In some embodiments, the total number of images with which comparisons may potentially be performed, using a trained model, for a newly-submitted source image may be very large—e.g., tens of millions of images may be available at an image analytics service. To reduce the number of comparisons to make at run time, a number of pre-processing steps may be taken in various embodiments. FIG. 10 illustrates a high-level overview of the use of pre-classified images for some types of image similarity applications, according to at least some embodiments.

In the depicted embodiment, the images available at the analytics service may be analyzed, e.g., with the help of models similar to the CNN models discussed earlier, and placed into various classes. For example, a pre-analyzed image collection 1004 may comprise some number of images classified as animals (class C1 in FIG. 10) and some other set of images classified as vehicles (class C2). When a new image (element 1010) to be checked for similarity with respect to the existing pre-analyzed images is received, one or more pre-processing algorithms (such as locality-sensitive hashing based algorithms and/or various other types of classification algorithms) may be employed to identify one or more classes $\{Ci\}$ to which the new image tentatively belongs. Then, instead of for example comparing the new image with all the images of the collection 1004, pairwise similarity score detections may be performed with images that belong to the set $\{Ci\}$ (element 1020). The pre-processing may potentially reduce the actual numbers of comparisons that have to be performed by orders of magnitude, resulting in substantial savings of time and/or resources in some embodiments.

It is noted that in various embodiments, some of the operations shown in FIG. 9 and/or FIG. 10 may be implemented in a different order than that shown in the figure, or may be performed in parallel rather than sequentially. Additionally, some of the operations shown in FIG. 9 and/or FIG. 10 may not be required in one or more implementations.

Use Cases

The techniques described above, of using mirrored multi-scale convolutional neural networks in combination with optimized selection of training image pairs for image similarity analysis, may be useful in a variety of scenarios. More and more applications, including for example search applications, image use policy violation applications, security applications and the like, may rely on efficient detection of similar images. Using the kinds of neural networks described, a wide range of features may be detected, enabling both subtle and coarse differences to be identified between the images of a given pair being analyzed. By intelligently selecting and sequencing the training image pairs, the overall training time and resources used for the image similarity models may be reduced substantially. In some cases, the described techniques may be able to incorporate semantic as well as visual similarity, which may be very helpful in a variety of applications such as providing responses to some types of search queries.

Illustrative Computer System

Figure 11:
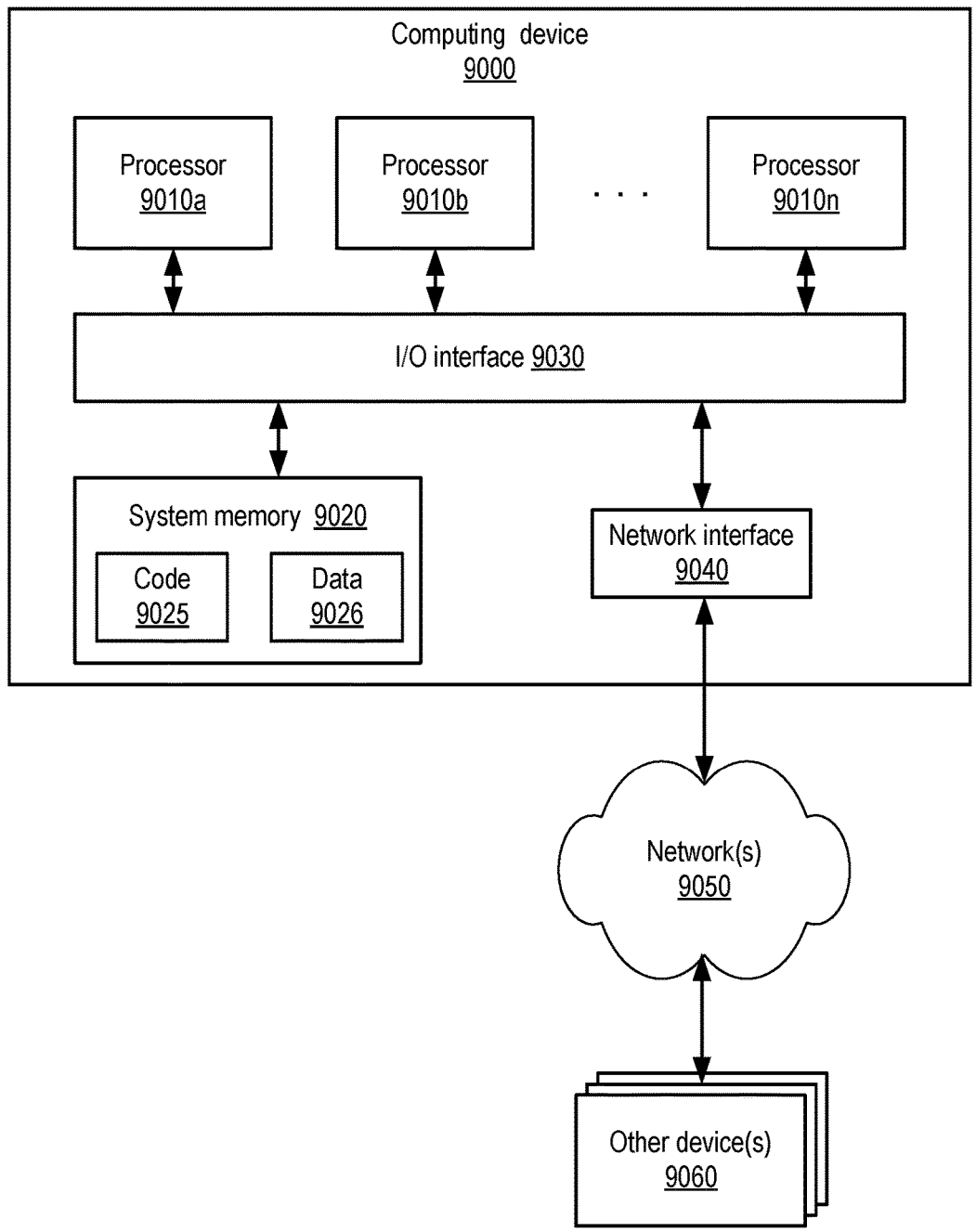
FIG. 11 is a block diagram illustrating an example computing device that may be used in at least some embodiments.

In at least some embodiments, a server that implements a portion or all of one or more of the technologies described herein, including the various components of the training and run-time subsystems of an image analytics service, including for example training coordinators, image collectors, image pair selectors, model training resources, run-time coordinators, pre-processors/classifiers, model execution resources and the like may include a general-purpose computer system that includes or is configured to access one or more computer-accessible media. FIG. 11 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 10, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 10 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. Further, a computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 11 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
    one or more computing devices of an artificial intelligence service;
    wherein the one or more computing devices are configured to:
        train a neural network based machine learning model to generate respective similarity scores for input image pairs, wherein the model comprises (a) a plurality of subnetworks including a first subnetwork and a second subnetwork and (b) one or more subnetwork output aggregation stages, wherein the first subnetwork comprises a first number of convolution layers and the second subnetwork comprises a second number of convolution layers, wherein a particular iteration of a plurality of training iterations of the model comprises:
            identifying a plurality of training image pairs, including (a) one or more pairs labeled as similar pairs and (b) one or more pairs labeled as dissimilar pairs;
            determining, using a version of the model corresponding to an earlier iteration of the plurality of training iterations, respective similarity scores for the training image pairs;
            obtaining, based at least in part on the respective similarity scores and one or more image pair discrimination difficulty criteria, a sorted subset of training image pairs from the plurality of training image pairs to be provided as training input to the model; and
            training the model using the sorted subset;
        obtain, using a trained version of the model, a first similarity score of a first pair of images, wherein at least one image of the first pair was not used to train the model; and
        in response to determining that the first similarity score meets a threshold criterion, cause one or more operations to be performed.

2. The system as recited in claim 1, wherein the plurality of subnetworks comprises a third subnetwork arranged in a mirrored configuration with respect to the first subnetwork, wherein during the particular iteration, (a) a respective image of a training image pair of the sorted subset is provided as input to the first subnetwork and the third subnetwork and (b) an update to a weight associated with the first subnetwork is duplicated at the third subnetwork.

3. The system as recited in claim 1, wherein a first training image pair labeled as a similar pair comprises a first image and a second image, wherein the one or more computing devices are configured to:
    determine, based at least in part on analysis of respective semantic metadata associated with the first and second images, that the second image is to be designated as an image similar to the first image.

4. The system as recited in claim 1, wherein determining the respective similarity scores of the plurality of training image pairs comprises utilizing a first set of execution platforms, and wherein training the model using the sorted subset comprises utilizing a second set of execution platforms.

5. The system as recited in claim 4, wherein the first set of execution platforms comprises one or more central processing units (CPUs), and wherein the second set of execution platforms comprises one or more graphics processing units (GPUs).

6. A method, comprising:
    performing, by one or more computing devices:
        training a neural network based machine learning model to generate respective similarity scores of input image pairs, wherein the model comprises a plurality of subnetworks including a first subnetwork and a second subnetwork, wherein the first subnetwork comprises a first number of convolution layers and the second subnetwork comprises a second number of convolution layers, wherein a particular iteration of a plurality of training iterations of the model comprises:
            determining, using a version of the model corresponding to an earlier iteration of the plurality of training iterations, respective similarity scores for a plurality of training image pairs;
            selecting, based at least in part on the respective similarity scores, a first subset of training image pairs from the plurality of training image pairs to be provided as training input to the model; and
            training the model using the first subset;
        obtaining, using a trained version of the model, a first similarity score of a first pair of images, wherein at least one image of the first pair was not used to train the model; and
        in response to determining that the first similarity score meets a threshold criterion, causing one or more operations to be performed.

7. The method as recited in claim 6, wherein the plurality of training image pairs includes at least a second pair labeled as a similar pair, wherein the second pair includes a first image and a second image, the method further comprising performing, by the one or more computing devices:
    modifying the first image to obtain the second image.

8. The method as recited in claim 6, wherein the plurality of training image pairs includes at least a second pair labeled as a dissimilar pair, wherein the second pair includes a first image and a second image, the method further comprising:
    using a random selection algorithm to select the second image from a collection of images.

9. The method as recited in claim 6, wherein determining the respective similarity scores of the plurality of training image pairs comprises utilizing a first set of execution resources, and wherein training the model using the subset comprises utilizing a second set of execution resources.

10. The method as recited in claim 9, wherein the first set of execution resources comprises one or more central processing units (CPUs), and wherein the second set of execution resources comprises one or more graphics processing units (GPUs).

11. The method as recited in claim 6, the method further comprising performing, by the one or more computing devices:
    selecting, before at least one image pair of the subset has been provided as input to train the model in the particular iteration, a group of training image pairs to be provided as training input to the model for a subsequent iteration.

12. The method as recited in claim 6, wherein selecting the first subset of training image pairs from the plurality of training image pairs comprises:
    sorting, based on an intra-pair distance metric, at least some image pairs of the plurality of training image pairs.

13. The method as recited in claim 6, wherein selecting the first subset of training image pairs from the plurality of training image pairs comprises:
    pruning, based at least in part on a separation margin constraint, at least some image pairs of the plurality of training image pairs.

14. The method as recited in claim 6, wherein selecting the first subset of training image pairs from the plurality of training image pairs comprises:
    sampling, using a training-iteration-count-dependent weight, at least some image pairs of the plurality of training image pairs.

15. The method as recited in claim 6, wherein selecting the first subset of training image pairs from the plurality of training image pairs comprises:
    excluding, from the plurality of training image pairs, at least one image based on a class imbalance criterion.

16. A non-transitory computer-accessible storage medium storing program instructions that when executed on one or more processors cause the one or more processors to:
    train a neural network based machine learning model to generate respective similarity scores of input image pairs, wherein the model comprises a plurality of subnetworks including a first subnetwork and a second subnetwork, wherein the first subnetwork comprises a first number of convolution layers and the second subnetwork comprises a second number of convolution layers, wherein a particular iteration of a plurality of training iterations of the model comprises:
        determining, using a version of the model corresponding to an earlier iteration of the plurality of training iterations, respective similarity scores for a plurality of training image pairs;
        selecting, based at least in part on the respective similarity scores, a first subset of training image pairs from the plurality of training image pairs to be provided as training input to the model; and
        training the model using the first subset; and
    in response to determining that a first similarity score, generated with respect to a particular image pair by a trained version of the neural network based machine learning model, meets a threshold criterion, cause one or more operations to be performed.

17. The non-transitory computer-accessible storage medium as recited in claim 16, wherein the plurality of subnetworks comprises a third subnetwork arranged in a mirrored configuration with respect to the first subnetwork, wherein during the particular iteration, (a) a respective image of a training image pair of the first subset is provided as input to the first subnetwork and the third subnetwork and (b) an update to a weight associated with the first subnetwork is duplicated at the third subnetwork.

18. The non-transitory computer-accessible storage medium as recited in claim 16, wherein the instructions when executed on the one or more processors cause the one or more processors to:
provide, as input to the first subnetwork during the particular iteration, a first subsample of a particular image of a first image pair of the first subset; and
provide, as input to the second subnetwork, a second subsample of the particular image, wherein a sampling ratio of the second subsample differs from a sampling ratio of the first subsample.

19. The non-transitory computer-accessible storage medium as recited in claim 16, wherein an output of the first subnetwork comprises a vector of a first dimensionality, and wherein output of the second subnetwork comprises a vector of a second dimensionality.

20. The non-transitory computer-accessible storage medium as recited in claim 19, wherein the neural network based machine learning model comprises one or more aggregation layers for output generated by the first and second subnetworks, wherein a particular aggregation layer of the one or more aggregation layers comprises one or more of: (a) an L2 normalization layer or (b) a linear embedding layer.

* * * * *